United States Patent
Araki et al.

(10) Patent No.: US 9,101,955 B2
(45) Date of Patent: Aug. 11, 2015

(54) ACTIVE ENERGY RAY-CURABLE INK COMPOSITION, INKJET RECORDING METHOD, DECORATIVE SHEET, DECORATIVE SHEET MOLDED PRODUCT, METHOD FOR PRODUCING IN-MOLD MOLDED PRODUCT, AND IN-MOLD MOLDED PRODUCT

(71) Applicant: FUJIFILM CORPORATION, Tokyo (JP)

(72) Inventors: Kenjirou Araki, Kanagawa (JP); Atsushi Sakamoto, Kanagawa (JP); Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 13/865,897

(22) Filed: Apr. 18, 2013

(65) Prior Publication Data

US 2013/0295342 A1 Nov. 7, 2013

(30) Foreign Application Priority Data

Apr. 19, 2012 (JP) .................. 2012-095551
Mar. 15, 2013 (JP) .................. 2013-054008

(51) Int. Cl.
| | | |
|---|---|---|
| C09D 11/00 | (2014.01) |
| B29C 45/14 | (2006.01) |
| B32B 3/10 | (2006.01) |
| B05D 3/06 | (2006.01) |
| C09D 11/101 | (2014.01) |
| C09D 11/30 | (2014.01) |

(52) U.S. Cl.
CPC . *B05D 3/06* (2013.01); *B29C 45/14* (2013.01); *B32B 3/10* (2013.01); *C09D 11/101* (2013.01); *C09D 11/30* (2013.01); *Y10T 428/24802* (2015.01)

(58) Field of Classification Search
None
See application file for complete search history.

(56) References Cited

U.S. PATENT DOCUMENTS

| | | |
|---|---|---|
| 8,220,912 B2 | 7/2012 | Nakamura |
| 2004/0024078 A1 | 2/2004 | Itoh et al. |
| 2006/0127591 A1 | 6/2006 | Itoh et al. |
| 2009/0041991 A1 | 2/2009 | Takano et al. |
| 2009/0202795 A1 | 8/2009 | Hayata et al. |
| 2010/0053290 A1 | 3/2010 | Nakamura |
| 2010/0075061 A1 | 3/2010 | Yokoi |
| 2010/0239779 A1 | 9/2010 | Oshima |
| 2011/0242191 A1 | 10/2011 | Mochizuki |
| 2012/0069082 A1* | 3/2012 | Hayata .................. 347/20 |
| 2013/0002773 A1 | 1/2013 | Fujii et al. |
| 2013/0065029 A1 | 3/2013 | Fujii |

FOREIGN PATENT DOCUMENTS

| | | |
|---|---|---|
| EP | 1992669 A1 | 11/2008 |
| EP | 2088176 A1 | 8/2009 |
| EP | 2159272 A1 | 3/2010 |
| EP | 2230284 A1 | 9/2010 |
| EP | 2433807 A1 | 3/2012 |
| EP | 2540783 A1 | 1/2013 |
| EP | 2568020 A1 | 3/2013 |
| JP | 2004-131725 A | 4/2004 |
| JP | 2010-059244 A | 3/2010 |
| JP | 2010-070692 A | 4/2010 |
| JP | 2010-070754 A | 4/2010 |
| JP | 2010-215798 A | 9/2010 |
| JP | 2011-225824 A | 11/2011 |
| JP | 2012-067178 A | 4/2012 |

OTHER PUBLICATIONS

The extended European search report issued on Jul. 25, 2013, which corresponds to EP13164461.9 and U.S. Appl. No. 13/865,897.
An Office Action; "Notice of Reasons for Rejection," issued by the Japanese Patent Office on May 20, 2014, which corresponds to Japanese Patent Application No. 2013-054008 and is related to U.S. Appl. No. 13/865,897; with English language translation.

\* cited by examiner

*Primary Examiner* — Vu A Nguyen
(74) *Attorney, Agent, or Firm* — Studebaker & Brackett PC

(57) ABSTRACT

An active energy ray-curable ink composition includes (component A) monofunctional radically polymerizable monomers, (component B) a polyfunctional oligomer having a glass transition temperature of 20° C. or lower and an acrylate value of 300 g/value or more, and (component C) a bifunctional radically polymerizable monomer having a viscosity at 25° C. of 15 mPa·s or less, wherein the component A includes an N-vinyl compound and a compound represented by the following formula (I), the content of the N-vinyl compound with respect to the total amount of the ink composition is from 10 to 50% by mass, and the content of the component A with respect to the total amount of the ink composition is 70% by mass or more.

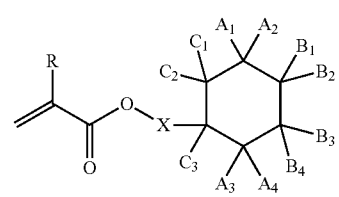

(I)

19 Claims, No Drawings

ACTIVE ENERGY RAY-CURABLE INK COMPOSITION, INKJET RECORDING METHOD, DECORATIVE SHEET, DECORATIVE SHEET MOLDED PRODUCT, METHOD FOR PRODUCING IN-MOLD MOLDED PRODUCT, AND IN-MOLD MOLDED PRODUCT

BACKGROUND OF THE INVENTION

1. Field of the Invention

The present invention relates to an active energy ray-curable ink composition, an ink jet recording method, a decorative sheet, a decorative sheet molded product, a method for producing an in-mold molded product, and an in-mold molded product.

2. Description of the Related Art

As an image recording method for forming an image on a recording medium such as paper based on image data signals, there are an electrophotographic system, a sublimation type and melt type thermal transfer system, an ink jet system, and the like. With regard to the ink jet system, since printing can be carried out with an inexpensive printing apparatus, and an image is formed directly on a recording medium by discharging ink only on a desired image area, the ink may be used efficiently, and thus, the running costs are low. In addition, the ink jet system causes little noise and is excellent as an image recording system.

In accordance with the ink jet system, it is possible to print not only on plain paper but also on a non-water absorbing recording medium such as a plastic sheet and a metal sheet, but achieving a higher printing speed and higher image quality during the printing are important issues, and the time required for drying and curing the liquid droplets after the printing tends to greatly influence the productivity of the printed material and the sharpness of an image obtained after the printing.

As one ink jet system, there is a recording system using an ink jet recording ink that is curable by the irradiation of active energy rays. In accordance with this method, by the irradiating with active energy rays immediately or after a certain period of time from ink injection to cure ink droplets, it is possible to form a sharp image.

JP2010-70692A discloses an ink composition including (A) a polymerizable polymer having a polymerizable group in a side chain of a main chain structure configured to include a urethane bond or a urea bond, and at least one selected from (a1) a fluoroalkyl group, (a2) a siloxane structure, and (a3) a long-chain alkyl structure, (B) a polymerizable compound which is different in the structure from the (A) polymerizable polymer, and (C) a photopolymerization initiator, as one example of an ink composition that is curable by the irradiation of active energy rays.

SUMMARY OF THE INVENTION

It is an object of the present invention to provide an active energy ray-curable ink composition which is capable of obtaining an image having excellent injection molding suitability (ink flow resistance), adhesiveness, and stretchability at a high temperature, in which cracking is inhibited during a punching processing, and an ink jet recording method, a decorative sheet, a decorative sheet molded product, a method for producing an in-mold molded product, and an in-mold molded product, each using the active energy ray-curable ink composition.

The above-described objects have been accomplished by the active energy ray-curable ink composition, the ink jet recording method, the decorative sheet, the decorative sheet molded product, the method for producing an in-mold molded product, and the in-mold molded product, described in <1>, <19>, <21>, <22>, <24>, and <25> below, which will be shown together with <2> to <18>, <20>, and <23> that are preferred embodiments.

<1> An active energy ray-curable ink composition including (component A) monofunctional radically polymerizable monomers, (component B) a polyfunctional oligomer having a glass transition temperature of 20° C. or lower and an acrylate value of 300 g/value or more, and (component C) a bifunctional radically polymerizable monomer having a viscosity at 25° C. of 15 mPa·s or less, wherein the component A includes an N-vinyl compound and a compound represented by the following formula (I), the content of the N-vinyl compound with respect to the total amount of the ink composition is from 10 to 50% by mass, and the content of the component A with respect to the total amount of the ink composition is 70% by mass or more:

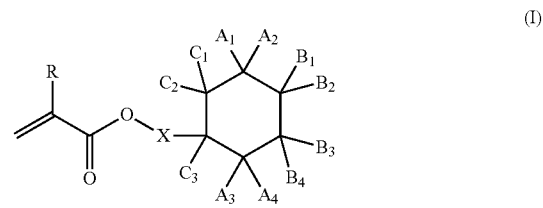

(I)

wherein R represents a hydrogen atom or a methyl group, $A_1$ to $A_4$, $B_1$ to $B_4$, and $C_1$ to $C_3$ each independently represent a hydrogen atom or an alkyl group, $A_1$ or $A_2$, and $A_3$ or $A_4$ may be bonded to each other to form a ring, $B_1$ or $B_2$, and $B_3$ or $B_4$ may be bonded to each other to form a ring, any one of $C_1$ to $C_3$ and any one of $A_1$ to $A_4$ and $B_1$ to $B_4$ may be bonded to each other to form a ring, and X represents a single bond or a divalent linking group.

<2> The active energy ray-curable ink composition as described in <1>, wherein the N-vinyl compound is a compound represented by the following formula (N):

(N)

wherein n represents an integer of 2 to 6.

<3> The active energy ray-curable ink composition as described in <1> or <2>, wherein the content of the N-vinyl compound with respect to the total amount of the ink composition is from 20 to 50% by mass.

<4> The active energy ray-curable ink composition as described in any one of <1> to <3>, wherein the content of the compound represented by the formula (I) with respect to the total amount of the ink composition is from 10 to 60% by mass.

<5> The active energy ray-curable ink composition as described in any one of <1> to <4>, wherein the compound represented by the formula (I) is a compound selected from the group consisting of the compounds represented by the following formulae (I-1) to (I-7)

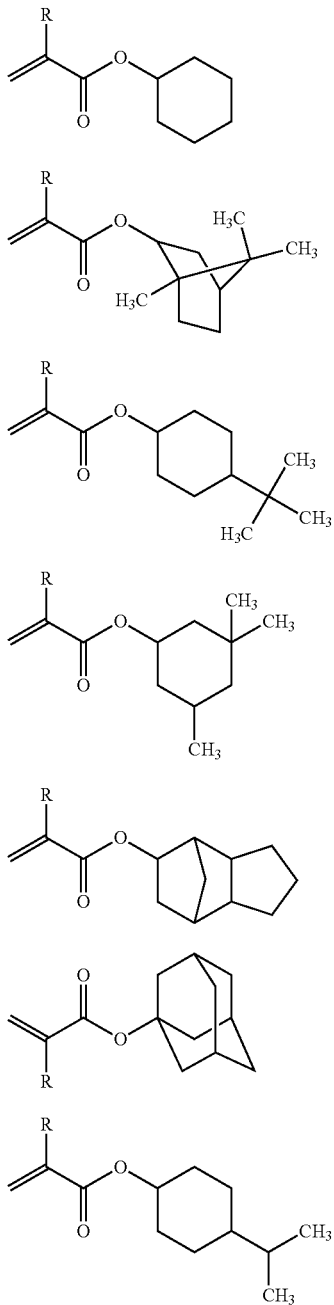

wherein R represents a hydrogen atom or a methyl group.

<6> The active energy ray-curable ink composition as described in any one of <1> to <5>, wherein the content of the component B with respect to the total amount of the ink composition is from 1 to 8% by mass.

<7> The active energy ray-curable ink composition as described in any one of <1> to <6>, wherein the content of the component C with respect to the total amount of the ink composition is from 0.1 to 5% by mass.

<8> The active energy ray-curable ink composition as described in any one of <1> to <7>, wherein the mass ratio of the content of the compound represented by the formula (I) to the content of the component B is the compound represented by the formula (I) the component B=30:1 to 1.5:1.

<9> The active energy ray-curable ink composition as described in any one of <1> to <8>, further including (component D) a polymerization initiator.

<10> The active energy ray-curable ink composition as described in <9>, wherein the component D contains an acylphosphine compound.

<11> The active energy ray-curable ink composition as described in <9> or <10>, wherein the component D contains a thioxanthone compound.

<12> The active energy ray-curable ink composition as described in any one of <1> to <11>, wherein the component B is an oligomer having an isophorone structure.

<13> The active energy ray-curable ink composition as described in any one of <1> to <12>, wherein the component C is a compound represented by the following formula (C-1)

wherein A represents a group selected from the group consisting of the following (A-1) to (A-3), A' represents a group selected from the group consisting of the following (A'-1) to (A'-3), and B represents a divalent linking group represented by the following formula (B-1) or (B-2):

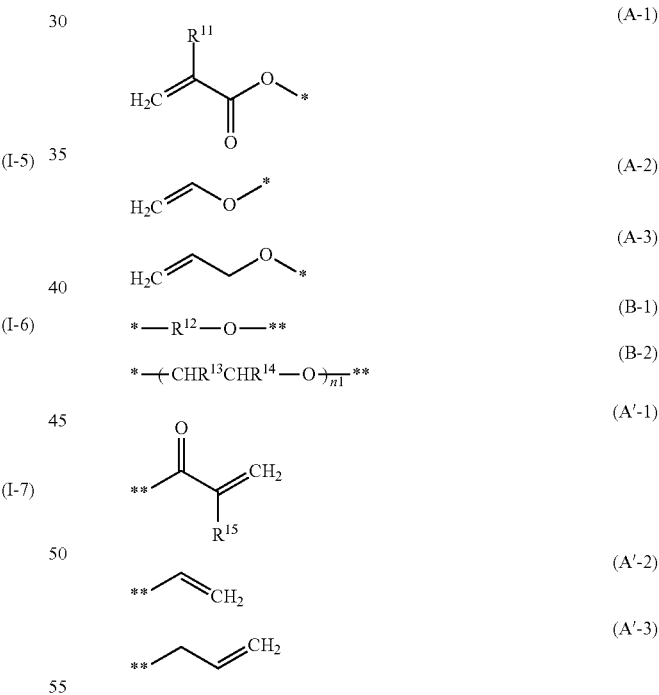

wherein $R^{11}$ represents a hydrogen atom or a methyl group, $R^{12}$ represents a saturated hydrocarbon group having 2 to 12 carbon atoms, one of $R^{13}$ and $R^{14}$ represents a hydrogen atom and the other represents a hydrogen atom or a methyl group, n1 represents an integer of 2 to 10, $R^{15}$ represents a hydrogen atom or a methyl group, * represents a bonding position between A and B, and ** represents a bonding position between B and A'.

<14> The active energy ray-curable ink composition as described in any one of <1> to <13>, wherein the component C is a compound represented by the following formula (C-2):

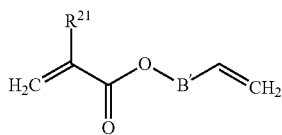
(C-2)

wherein $R^{21}$ represents a hydrogen atom or a methyl group, and B' represents a group represented by the following formula (B'-1) or (B'-2):

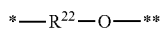
(B'-1)

(B'-2)

wherein $R^{22}$ represents a saturated hydrocarbon group having 2 to 12 carbon atoms, one of $R^{23}$ and $R^{24}$ represents a hydrogen atom and the other represents a hydrogen atom or a methyl group, and n2 represents an integer of 2 to 10, * represents the bonding position between the (meth)acryloxy group and B', and ** represents the bonding position between B and the vinyl group.

<15> The active energy ray-curable ink composition as described in any one of <1> to <14>, further including a compound represented by the following formula (II) as the component A:

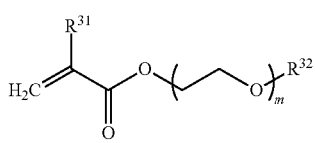
(II)

wherein $R^{31}$ represents a hydrogen atom or a methyl group, $R^{32}$ represents a methyl group or an ethyl group, and m represents an integer of 1 to 5.

<16> The active energy ray-curable ink composition as described in any one of <1> to <15>, further including (component E) a resin having a urethane bond in the main chain, an ethylenically unsaturated group in a side chain and/or at an terminal of the main chain, and a siloxane structure in a side chain and/or at a terminal of the main chain.

<17> The active energy ray-curable ink composition as described in any one of <1> to <16>, further including 2-(2-ethoxyethoxy)ethyl (meth)acrylate as the component A.

<18> The active energy ray-curable ink composition as described in any one of <1> to <17>, which is used for ink jet recording.

<19> An ink jet recording method comprises ($a^1$) discharging the active energy ray-curable ink composition as described in any one of <1> to <18> onto a recording medium by an ink jet system, and ($b^1$) irradiating the discharged ink composition with active energy rays to cure the ink composition.

<20> The ink jet recording method as described in <19>, wherein the light source of active energy rays is a light-emitting diode.

<21> A decorative sheet having a cured image layer of the active energy ray-curable ink composition as described in any one of <1> to <18> provided on a resin sheet.

<22> A decorative sheet molded product obtained by subjecting the decorative sheet as described in <21> to vacuum molding, pressure molding, or vacuum pressure molding.

<23> The decorative sheet molded product as described in <22>, wherein punching processing is carried out after the vacuum molding, pressure molding or vacuum pressure molding.

<24> A method for producing an in-mold molded product, comprises disposing the decorative sheet as described in <21> or the decorative sheet molded product as described in <22> or <23> on the inner wall of a hollow portion formed by plural molds, and injecting a molten resin from a gate into the hollow portion.

<25> An in-mold molded product obtained by the production method as described in <24>.

According to the present invention, an active energy ray-curable ink composition which is capable of obtaining an image having excellent injection molding suitability (ink flow resistance), adhesiveness, and stretchability at a high temperature, in which cracking is inhibited during punching processing, and an ink jet recording method, a decorative sheet, a decorative sheet molded product, a method for producing an in-mold molded product, and an in-mold molded product, each using the active energy ray-curable ink composition, can be provided.

DESCRIPTION OF THE PREFERRED EMBODIMENTS

Hereinbelow, the invention will be described in detail.

Further, in the present specification, the description of "xx to yy" denotes a numerical value including xx and yy. Further, "(component A) monofunctional radically polymerizable monomers" and the like are also simply referred to a "component A" and the like.

"(Meth)acrylate" and the like have the same definitions as "acrylate and/or methacrylate" and the like, which shall apply hereinafter.

In addition, in the present invention, "% by mass" and "part(s) by mass" have the same definitions as "% by weight" and "part(s) by weight", respectively.

1. Active Energy Ray-Curable Ink Composition

The active energy ray-curable ink composition of the present invention (which is also simply referred to as "ink composition") includes (component A) monofunctional radically polymerizable monomers, (component B) a polyfunctional oligomer having a glass transition temperature of 20° C. or lower and an acrylate value of 300 g/value or more, and (component C) a bifunctional radically polymerizable monomer having a viscosity at 25° C. of 15 mPa·s or less, wherein the component A includes an N-vinyl compound and a compound represented by the following formula (I), the content of the N-vinyl compound with respect to the total amount of the ink composition is from 10 to 50% by mass, and the content of the component A with respect to the total amount of the ink composition is 70% by mass or more.

In addition, the active energy ray-curable ink composition of the present invention may be preferably used as the active energy ray-curable ink jet ink composition of the present invention.

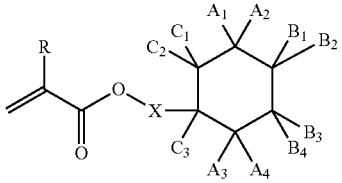

(I)

wherein R represents a hydrogen atom or a methyl group, $A_1$ to $A_4$, $B_1$ to $B_4$, and $C_1$ to $C_3$ each independently represent a hydrogen atom or an alkyl group, $A_1$ or $A_2$, and $A_3$ or $A_4$ may be bonded to each other to form a ring, $B_1$ or $B_2$, and $B_3$ or $B_4$ may be bonded to each other to form a ring, any one of $C_1$ to $C_3$ and any one of $A_1$ to $A_4$ and $B_1$ to $B_4$ may be bonded to each other to form a ring, and X represents a single bond or a divalent linking group.

The ink composition of the present invention is an oily ink composition that is curable with active energy rays (which are also referred to as "active rays"). The "active energy rays" are radioactive rays capable of imparting energy that generates an initiating species in an ink composition by the irradiation of the rays, and examples thereof include α rays, γ rays, X rays, ultraviolet rays, visible light, and an electron beam. Among these, from the viewpoints of curing sensitivity and easiness of obtaining a device, ultraviolet rays and an electron beam are preferable, and ultraviolet rays are more preferable. Accordingly, the ink composition of the present invention is preferably one that is curable by irradiating ultraviolet rays as the active energy rays.

Since the ink film is stretched during a molding process, with the ink composition applied to a printing sheet (decorative sheet) to be subjected to the molding process, a high degree of flexibility for a cured film is required. In addition, cured film strength is also required to withstand the molding process.

The ink film (image) obtained with an active energy ray-curable ink composition in the related art has problems that film strength is insufficient, scratches and white spots are generated during the molding process, or the ink film does not withstand stretching to cause cracks or peeling from a substrate.

Furthermore, in an insert mold molding mold for disposing a decorative sheet molded article in a cavity of a mold and injecting a molten resin thereinto to fuse and integrate a resin molded product including the decorative sheet molded article and the molten resin, in a case where an image layer is formed on the surface of the molten resin side, there is a problem that an ink flow in the image layer occurs by the injection of a molten resin. Also, to the contrary, in a case where a resin molded product including a molten resin is fused on the side of the substrate, there is a problem that it sticks to the mold.

The present inventors have investigated intensively, and as a result, they have found that the above-described problems are solved by using an active energy ray-curable ink composition, which includes 70% by mass or more of monofunctional radically polymerizable monomers, a polyfunctional oligomer, and a bifunctional radically polymerizable monomer, wherein at least an N-vinyl compound and a compound represented by the formula (I) are included as the monofunctional radically polymerizable monomers, thereby completing the present invention.

(Component A) Monofunctional Radically Polymerizable Monomers

The ink composition of the present invention includes (component A) monofunctional radically polymerizable monomers, the component A includes an N-vinyl compound and a compound represented by the formula (I), the content of the N-vinyl compound with respect to the total amount of the ink composition is from 10 to 50% by mass, and the content of the component A with respect to the total amount of the ink composition is 70% by mass or more.

Here, the monofunctional radically polymerizable monomer means a compound having only one radically polymerizable ethylenically unsaturated bond and having a molecular weight of 500 or less.

Examples of the radically polymerizable ethylenically unsaturated group preferably include a (meth)acryloyloxy group, a (meth)acryl amide group, a vinyloxy group, an allyloxy group, and an N-vinyl group.

The ink composition of the present invention includes the component A in an amount of 70% by mass or more with respect to the total amount of the ink composition. If the content of the monofunctional radically polymerizable monomers is less than 70% by mass, it is difficult to obtain an image having excellent stretchability.

The amount of the component A is preferably from 70 to 95% by mass, more preferably from 72 to 92% by mass, and even more preferably from 75 to 90% by mass, with respect to the total amount of the ink composition.

(Component A-1) N-Vinyl Compound

The ink composition of the present invention includes an N-vinyl compound as the (component A) monofunctional radically polymerizable monomers.

As the N-vinyl compound, N-vinyl lactams are preferable, and a compound represented by the formula (N) is more preferable.

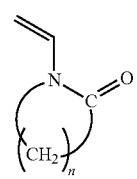

(N)

In the formula (N), n represents an integer of 2 to 6, and from the viewpoints of the flexibility after curing the ink composition, adhesiveness to a recording medium, and availability of raw materials, n is preferably an integer of 3 to 6, more preferably 3 or 5, and particularly preferably 5, that is, an N-vinyl caprolactam is particularly preferable. The N-vinyl caprolactam has excellent safety and utility for general purposes, is available at relatively low cost, and particularly, the N-vinyl caprolactam is capable of providing satisfactory ink curability and adhesiveness of a cured film to a recording medium, which is therefore preferable.

Furthermore, the N-vinyl lactams may have a substituent such as an alkyl group and an aryl group on a lactam ring, or may be linked to a saturated or unsaturated ring structure.

The N-vinyl compound may be used singly or in combination of two or more kinds thereof.

The ink composition of the present invention includes the N-vinyl compound in an amount of 10 to 50% by mass, preferably 20 to 50% by mass, more preferably 20 to 40% by mass, and even more preferably 24 to 35% by mass, with respect to the total mass of the ink composition. Within the above ranges, an ink composition which is excellent in adhesiveness, stretchability, and ink flow resistance of the obtained image is obtained.

(Component A-2) Compound Represented by Formula (I)

The ink composition of the present invention includes a compound represented by the following formula (I) as the (component A) monofunctional radically polymerizable monomers.

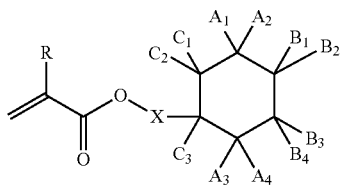

wherein R represents a hydrogen atom or a methyl group, $A_1$ to $A_4$, $B_1$ to $B_4$, and $C_1$ to $C_3$ each independently represent a hydrogen atom or an alkyl group, $A_1$ or $A_2$, and $A_3$ or $A_4$ may be bonded to each other to form a ring, $B_1$ or $B_2$, and $B_3$ or $B_4$ may be bonded to each other to form a ring, any one of $C_1$ to $C_3$ and any one of $A_1$ to $A_4$ and $B_1$ to $B_4$ may be bonded to each other to form a ring, and X represents a single bond or a divalent linking group.

In the formula (I), the lower alkyl group that may be employed as $A_1$ to $A_4$, $B_1$ to $B_4$, and $C_1$ to $C_3$ represents an alkyl group having 1 to 5 carbon atoms and also represents both of chained and branched alkyl groups. Examples of the lower alkyl group include a methyl group, an ethyl group, an n-propyl group, an isopropyl group, an n-butyl group, a tert-butyl group, and a tert-amyl group.

The alicyclic group to which $A_1$ to $C_3$ are bonded is a monovalent group, and examples thereof include monocyclic hydrocarbon groups such as a cyclohexane ring, and bridged cyclic hydrocarbon groups such as a bicyclo[3.2.1]octane ring.

Incidentally, in a case where $A_1$ or $A_2$, and $A_3$ or $A_4$ are bonded to each other to form a ring; $B_1$ or $B_2$, and $B_3$ or $B_4$ are bonded to each other to form a ring; or any one of $C_1$ to $C_3$ and any one of $A_1$ to $A_4$ and $B_1$ to $B_4$ are bonded to each other to form a ring, atoms contained in these rings are preferably carbon atoms or oxygen atoms, and more preferably carbon atoms, and the number of carbon atoms is preferably from 1 to 3, and more preferably 1 or 2 Further; the carbon atoms contained in these rings may be substituted with a methyl group.

In the formula (I), X is preferably a single bond. Further, preferable examples of the divalent linking group in X include linear or branched alkylene groups having 1 to 10 carbon atoms.

Examples of the compound represented by the formula (I) preferably include compounds represented by the following formulae (I-1) to (I-7), and among these, cyclohexyl (meth)acrylate (a compound represented by the formula (I-1)), isobornyl (meth)acrylate (a compound represented by the formula (I-2)), 4-t-butylcyclohexyl (meth)acrylate (a compound represented by the formula (I-3)), 3,3,5-trimethylcyclohexyl (meth)acrylate (a compound represented by the formula (I-4)), and dicyclopentanyl (meth)acrylate (a compound represented by the formula (I-5)); more preferably cyclohexyl (meth)acrylate, isobornyl (meth)acrylate, 3,3,5-trimethylcyclohexyl (meth)acrylate, and dicyclopentanyl (meth)acrylate; and particularly preferably isobornyl (meth)acrylate.

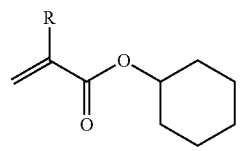

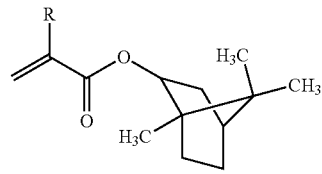

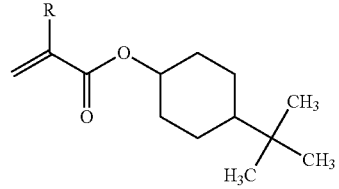

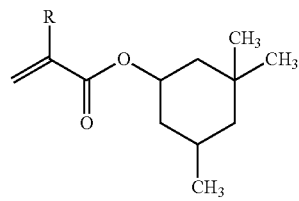

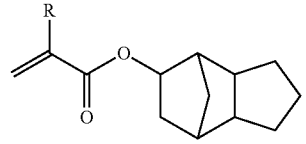

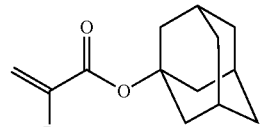

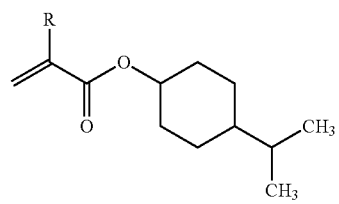

wherein R represents a hydrogen atom or a methyl group.

The compound represented by the formula (I) may be used singly or in combination of two or more kinds thereof.

The ink composition of the present invention includes the compound represented by the formula (I) in an amount of preferably 5 to 60% by mass, more preferably from 10 to 60% by mass, and even more preferably from 15 to 30% by mass, with respect to the total mass of the ink composition. Within the above ranges, an ink composition which is excellent in adhesiveness and ink flow resistance of the obtained image, and inhibition of cracks during the punching processing is obtained.

(Component A-3) Compound Represented by Formula (II)

The ink composition of the present invention preferably further includes a compound represented by the following formula (II) as the (component A) monofunctional radically polymerizable monomers. When the compound represented by the formula (II) is included, viscosity suitability for excellent ink jet recording is obtained as well as adhesiveness and stretchability being excellent, which is therefore preferable

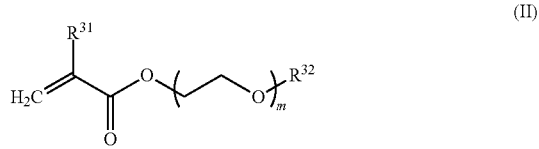

(II)

in the formula (II), $R^{31}$ represents a hydrogen atom or a methyl group, $R^{32}$ represents a methyl group or an ethyl group, and m represents an integer of 1 to 5.

In the formula (II), $R^{31}$ is a hydrogen atom or a methyl group, and preferably a hydrogen atom.

$R^{32}$ represents a methyl group or an ethyl group, and preferably an ethyl group.

m represents an integer of 1 to 5, more preferably an integer of 2 to 4, and particularly preferably 2.

Specific examples of the compound represented by the formula (II) include ethoxyethyl (meth)acrylate, ethoxyethoxyethyl (meth)acrylate, and methoxyethyl acrylate, and among these, 2-(2-ethoxyethoxy)ethyl (meth)acrylate is preferable, and 2-(2-ethoxyethoxy)ethyl acrylate is more preferable.

For the ink composition of the present invention, the compound represented by the formula (II) may be used singly or in combination of plural kinds thereof. The content of the compound represented by the formula (II) with respect to the total amount of the ink composition is preferably from 0.3 to 20% by mass, more preferably from 1 to 15% by mass, and even more preferably from 3 to 10% by mass, from the viewpoints of viscosity suitability, adhesiveness, and stretchability.

(Component A-4) Other Monofunctional Radically Polymerizable Monomer

The ink composition of the present invention may include another monofunctional radically polymerizable monomer, in addition to the N-vinyl compound, the compound represented by the formula (I), and the compound represented by the formula (II), as the (component A) monofunctional radically polymerizable monomers.

As such another monofunctional radically polymerizable monomer, a monofunctional (meth)acrylate monomer having an aromatic group may be preferably used. The cyclic structure of the aromatic group of the monofunctional (meth) acrylate monomer having an aromatic group may contain heteroatoms such as O, N, and S.

Among these, as the monofunctional (meth)acrylate monomer having an aromatic group, phenoxyethyl (meth) acrylate is particularly preferable, and phenoxyethyl acrylate is most preferable.

Furthermore, a (meth)acrylate monomer having a chained hydrocarbon group having 8 to 13 carbon atoms may be included as the other monofunctional radically polymerizable monomer. The chained hydrocarbon group may be either a straight-chain hydrocarbon group or a branched hydrocarbon group.

As the (meth)acrylate monomer having a chained hydrocarbon group having 8 to 13 carbon atoms, a (meth)acrylic ester of a chained hydrocarbon monoalcohol having 8 to 13 carbon atoms is preferable, and a (meth)acrylic ester of a chained hydrocarbon monoalcohol having 10 to 13 carbon atoms is more preferable.

Specific examples thereof include octyl (meth)acrylate, isoctyl (meth)acrylate, nonyl (meth)acrylate, decyl (meth) acrylate, isodecyl (meth)acrylate, lauryl (meth)acrylate, and tridecyl (meth)acrylate.

Furthermore, examples of the other monofunctional (meth)acrylate monomer include isobornyl (meth)acrylate, norbornyl (meth)acrylate, 2-ethyl hexyl (meth)acrylate, 2-hydroxyethyl (meth)acrylate, butoxyethyl (meth)acrylate, carbitol (meth)acrylate, cyclohexyl (meth)acrylate, tetrahydrofurfuryl (meth)acrylate, benzyl (meth)acrylate, methyl (meth)acrylate, n-butyl (meth)acrylate, allyl (meth)acrylate, glycidyl (meth)acrylate, dimethylaminomethyl (meth)acrylate, epoxy(meth)acrylate, and cyclic trimethylolpropaneformal (meth)acrylate.

Among these, as the other monofunctional radically polymerizable monomer, phenoxyethyl (meth)acrylate is particularly preferable, and phenoxyethyl acrylate is most preferable.

The other monofunctional radically polymerizable monomer may be used singly or in combination of plural kinds thereof.

The content of the other monofunctional radically polymerizable monomer with respect to the total amount of the ink composition is preferably 50% by mass or less, more preferably 45% by mass or less, even more preferably from 10 to 40% by mass, and particularly preferably from 20 to 40% by mass.

(Component B) Polyfunctional Oligomer Having Glass Transition Temperature of 20° C. or Lower and Acrylate Value of 300 g/Value or More The ink composition of the present invention includes (component B) a polyfunctional oligomer having a glass transition temperature of 20° C. or lower and an acrylate value of 300 g/value or more. When the ink composition includes the component B, high stretchability of the obtained image is maintained while the ink flow resistance is improved.

The oligomer is generally a polymer formed by the bonding of a definite number (usually 5 to 100) of monomers, and in the present invention, a compound has a weight average molecular weight in the range of more than 500 to 15,000 or less.

Incidentally, examples of the "acrylate" of the acrylate value in the component B and the "acrylate" in the polyfunctional acrylate oligomer include both of an acryloxy group and a methacryloxy group.

The weight average molecular weight of the component B is preferably from 1,000 to 15,000, more preferably from 1,500 to 12,000, and even more preferably from 3,500 to 12,000.

Moreover, in the component B, the glass transition temperature of 20° C. or lower denotes the glass transition temperature of a homopolymer of the component B and is measured by means of a dynamic mechanical analyzer (DMA). Further, the glass transition temperature of the homopolymer sometimes depends on the degree of polymerization, but when a homopolymer having a weight average molecular weight of 10,000 or more is produced and measured, the effect of the degree of polymerization is negligible.

More specifically, 5 parts by mass of 2,4,6-trimethylbenzoyldiphenylphosphine oxide (TPO) as a polymerization initiator is dissolved in 100 parts by mass of the component B and coated to a film thickness of 100 µm, and infrared rays are irradiated at 2,000 mW/cm² and 10 mJ/cm² to produce a cured film. This film is measured by means of a dynamic mechanical analyzer (DMA) at −20° C. to 200° C., and the temperature for glass transition is taken as a glass transition temperature (Tg) of the oligomer.

The glass transition temperature of the component B is 20° C. or lower, preferably 18° C. or lower, and more preferably 15° C. or lower. Further, the lower limit of the glass transition temperature is not particularly limited, but is preferably −60° C. or higher, more preferably −50° C. or higher, and even more preferably −40° C. or higher.

If the glass transition temperature of the component B is 20° C. or lower, the punching suitability is excellent, while if the glass transition temperature of the component B is −60° C. or higher, the ink suitability is excellent.

The component B has an acrylate value of 300 g/value or more. Here, the "acrylate value" refers to a value obtained by dividing a weight average molecular weight by the average total number of the acryloxy groups and the methacryloxy groups per molecule, and is given by the following equation.

Acrylate value=(Weight average molecular weight)/(Average total number of (meth)acryloxy groups per molecule)

From the viewpoints of satisfying both of the stretchability and the ink flow resistance, the acrylate value of the component B is 300 g/value or more.

The acrylate value of the component B is 300 g/value or more, preferably 600 g/value or more, and more preferably 800 g/value or more. The upper limit of the acrylate value is not particularly limited, but is preferably 20,000 g/value or less, more preferably 10,000 g/value or less, and even more preferably 8,000 g/value or less. If the acrylate value of the component B is 20,000 g/value or less, the stretchability is excellent.

The method of for measuring the acrylate value is not particularly limited and the acrylate value is measured by any of known methods. The acrylate value may be suitably measured by a combination of, for example, structural analysis of the oligomers, measurement of weight average molecular weights, titration of the amount of ethylenically unsaturated bonds using iodine or the like, calculation of the amount of ethylenically unsaturated bonds by means of $^1$H NMR and/or $^{13}$C NMR, and the like. Further, the weight average molecular weight of the component B is preferably measured by a gel permeation chromatography method. For the measurement using the gel permeation chromatography method in the present invention, an HLC-8020 GPC (manufactured by Tosoh Corporation); as the columns, TSKgel Super HZ M-H, TSKgel Super HZ4000, and TSKgel Super HZ200 (all manufactured by Tosoh Corporation, 4.6 mm ID×15 cm); and as an eluent, THF (tetrahydrofuran) are preferably used.

In the present invention, the number of the functional groups (the total number of the (meth)acryloxy groups) per molecule of the component B is preferably from 2 to 6, more preferably from 2 to 4, even more preferably 2 or 3, and most preferably 2.

As the polyfunctional acrylate oligomer in the present invention, oligoester acrylates are preferable, and among these, a urethane acrylate oligomer, a polyester acrylate oligomer, and an epoxy acrylate oligomer are more preferable, and a urethane acrylate oligomer is even more preferable.

Examples of the urethane acrylate oligomer preferably include an aliphatic urethane acrylate oligomer and an aromatic urethane acrylate oligomer, and more preferably an aliphatic urethane acrylate oligomer.

Furthermore, as the urethane acrylate oligomer, a tetrafunctional or lower functional urethane acrylate oligomer is preferable, and a bifunctional urethane acrylate oligomer is more preferable.

When the urethane acrylate oligomer is included, the adhesiveness of a substrate is excellent and an ink composition having excellent curability is obtained.

As for the component B, reference may be made to Oligomer Handbook (reviewed by Junji FURUKAWA, The Chemical Daily Co., Ltd).

As the urethane acrylate oligomer, those having an isophorone skeleton and those having a polyester skeleton are preferable, and those having an isophorone skeleton and a polyester skeleton are more preferable.

As the component B, an oligomer having a partial structure represented by the following formula (b-1) is preferable.

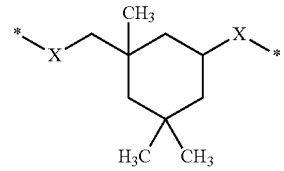

(b-1)

in the formula (b-1), X's each independently represent a urethane bond, an ester bond, an ethyleneoxy (EO) group, a propyleneoxy (PO) group, or an alkylene group, and * represents the bonding position.

In the formula (b-1), X represents a urethane bond (—NH—CO—), an ester bond (—CO—O—), an ethyleneoxy (EO) group, a propyleneoxy (PO) group, or an alkylene group. The alkylene group preferably has 1 to 12 carbon atoms, more preferably 1 to 8 carbon atoms, even more preferably 1 to 6 carbon atoms, and particularly preferably 1 to 4 carbon atoms.

Among these, X is preferably a urethane bond. That is, the component B is preferably one having an isophorone structure represented by the formula (b-1') and a partial structure containing a urethane bond.

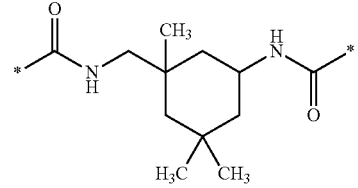

(b-1')

in the formula (b-1'), * represents the bonding position.

Furthermore, the component B more preferably has a partial structure represented by the formula (b-2).

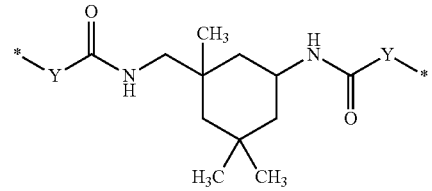

(b-2)

in the formula (b-2), Y's each independently represent an ester bond, an ether bond, a carbonyl group, an alkylene group, or a group formed by a combination of two or more out of these groups, and * represents the bonding position.

In the formula (b-2), Y represents an ester bond (—CO—O—), an ether bond (—O—), a carbonyl group (—CO—), an alkylene group, or a group formed by a combination of two or more out of these groups. The alkylene group may be any one of linear, branched, and cyclic alkylene groups, and preferably has 1 to 24 carbon atoms, more preferably 2 to 20 carbon atoms, even more preferably 2 to 16 carbon atoms, particularly preferably 2 to 12 carbon atoms.

In a case where Y is a group formed by a combination of two or more out of an ester bond, an ether bond, a carbonyl group (—CO—), or an alkylene group, examples of the group include an alkyleneoxy group (an ethyleneoxy group and a propyleneoxy group), and a poly(alkyleneoxy) group.

Among these, Y preferably includes a group represented by the following formulae (Y-1) to (Y-5), or a group formed by a combination of two or more out of these groups.

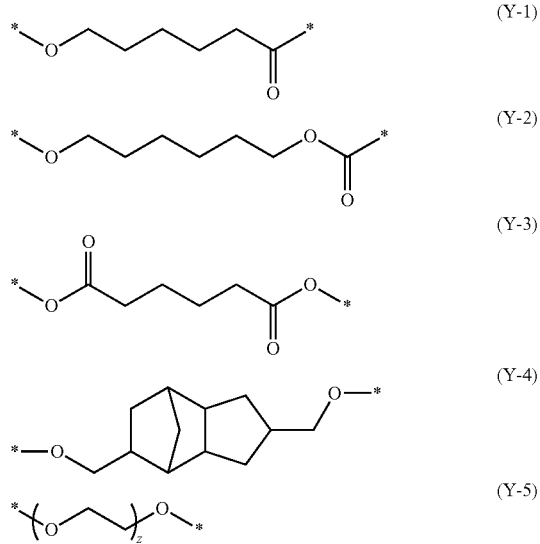

wherein z represents an integer of 1 to 100.

Furthermore, the component B preferably has a (meth)acryloxy group at the end, and more preferably a group having an end represented by the following formula (b-3).

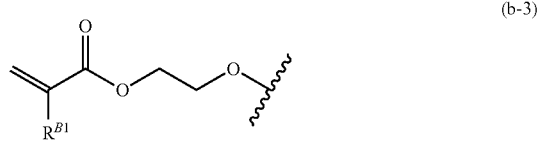

in the formula (b-3), $R^{B1}$ represents a hydrogen atom or a methyl group, and * represents the bonding position with another structure.

The component B is preferably a linear bifunctional oligomer.

Furthermore, the monomer unit having an isophorone structure in the urethane acrylate oligomer having an isophorone structure preferably has an amount of 1 to 30% by mole, more preferably from 2 to 28% by mole, and even more preferably from 3 to 25% by mole, with respect to the total monomer units forming an oligomer.

Furthermore, examples of a commercially available product of the polyfunctional acrylate oligomer are as follows.

Examples of a commercially available product of the urethane acrylate oligomer include EBECRYL series manufactured by Daicel-Cytec Company Ltd. (for example, EBECRYL 210 (acrylate value: 750 g/value, Tg≤20° C.), 230 (acrylate value: 2,500 g/value, Tg=−55° C.), 244 (acrylate value: 1,000 g/value, Tg≤20° C.), 270 (acrylate value: 750 g/value, Tg=−27° C.), 4858 (acrylate value: 300 g/value, Tg≤20° C.), 8402 (acrylate value: 500 g/value, Tg=14° C.), 9270 (acrylate value: 500 g/value, Tg≤20° C.)), U-200 PA manufactured by Shin-Nakamura Chemical Co., Ltd. (acrylate value: 1,300 g/value, Tg≤20° C.), UA122P (acrylate value: 550 g/value, Tg≤20° C.), UA160TM (acrylate value: 1,000 g/value, Tg≤20° C.), U108A (acrylate value: 800 g/value, Tg≤20° C.), and the like, UV2000B manufactured by Nippon Synthetic Chemical Industry Co., Ltd. (acrylate value: 6,500 g/value, Tg=−38° C.), UV3000B (acrylate value: 9,000 g/value, Tg=−39° C.), UV3200B (acrylate value: 5,000 g/value, Tg=−8° C.), UV3310B (acrylate value: 6,500 g/value, Tg=−30° C.), UV3700B (acrylate value: 19,000 g/value, Tg=−6° C.), and C9007 manufactured by Sartomer Co., Inc. (acrylate value: 2,250 g/value, Tg=1° C.).

Examples of a commercially available product of the polyester acrylate oligomer include EBECRYL series manufactured by Daicel-Cytec Company Ltd. (for example, EBECRYL 812 (acrylate value: 400 g/value, Tg≤20° C.), 853 (acrylate value: 300 g/value, Tg 20° C.), and 884 (acrylate value: 1,500 g/value, Tg≤20° C.)).

Furthermore, examples of a commercially available product of the epoxy acrylate include EBECRYL series manufactured by Daicel-Cytec Company Ltd. (for example, EBECRYL 3708 (acrylate value: 750 g/value, Tg≤20° C.)).

In the present invention, the component B may be used singly or in combination of two or more kinds thereof.

The content of the component B with respect to the total amount of the ink composition is preferably from 0.1 to 10% by mass, more preferably from 1 to 8% by mass, and even more preferably from 3 to 7% by mass. Within the above ranges, punching suitability, stretchability, and ink flow resistance are excellent. Further, the mass ratio of the content of the compound represented by the formula (I) to the content of the component B is as follows: preferably the compound represented by the formula (I):component B=30:1 to 1.5:1, and more preferably 30:1 to 2:1.

Furthermore, in the present invention, a case where the ink composition includes other oligomers such as a polyfunctional acrylate oligomer having a glass transition temperature of more than 20° C., a polyfunctional acrylate oligomer having an acrylate value of less than 300 g/value, and a monofunctional acrylate oligomer is not excluded, but the content of the other oligomers is preferably 5% by mass or less, more preferably 3% by mass or less, and even more preferably 1% by mass or less, with respect to the total amount of the ink composition, and particularly preferably other oligomers are not included.

(Component C) Bifunctional Monomer Having Viscosity at 25° C. of 15 mPa·s or Less The ink composition of the present invention includes (component C) a bifunctional monomer having a viscosity at 25° C. of 15 mPa·s (millipascal-second, centipoise (cP)) or less. When the ink composition includes the component C, the viscosity of the ink decreases, and thus, the dischargeability is improved, and further, the adhesiveness and the heat resistance are improved. Further, the component C is a compound other than the component B.

Furthermore, in the present invention, the method for measuring the viscosity at 25° C. of a polymerizable compound (a monomer, an oligomer, or the like) or an ink composition is not particularly limited, but is preferably a measurement method in accordance with JIS Z8803.

In addition, a device for measuring the viscosity is preferably one using a rotary viscometer, and more preferably a B type or E type rotary viscometer.

For the method for measuring the viscosity at 25° C. of the polymerizable compound and the ink composition, specifically, it is, for example, preferable that measurement be carried out after rotating a rotor at a liquid temperature of 25° C. using an RE80 type viscometer (manufactured by Toki Sangyo Co., Ltd.) for 2 minutes and stabilizing it.

As the component C, a compound represented by the following formula (C-1) is preferable.

A-B-A'  (C-1)

(in the formula (C-1), A represents a group selected from the group consisting of the following (A-1) to (A-3), A' represents a group selected from the group consisting of the following (A'-1) to (A'-3), and B represents a divalent linking group represented by the following formula (B-1) or (B-2)):

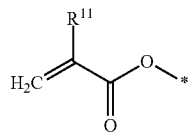
(A-1)

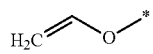
(A-2)

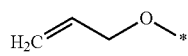
(A-3)

*—$R^{12}$—O—**  (B-1)

*—$(CHR^{13}CHR^{14}$—O$)_{n1}$—**  (B-2)

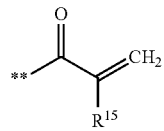
(A'-1)

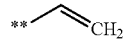
(A'-2)

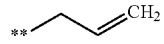
(A'-3)

wherein $R^{11}$ represents a hydrogen atom or a methyl group, $R^{12}$ represents a saturated hydrocarbon group having 2 to 12 carbon atoms, one of $R^{13}$ and $R^{14}$ represents a hydrogen atom and the other represents a hydrogen atom or a methyl group, n1 represents an integer of 2 to 10, $R^{15}$ represents a hydrogen atom or a methyl group, * represents a bonding position between A and B, and ** represents a bonding position between B and A'.

In the formula (B-1), $R^{12}$ represents a saturated hydrocarbon group having 2 to 12 carbon atoms, and the saturated hydrocarbon group may be any one of a linear, branched, or cyclic saturated hydrocarbon group, but preferably a linear or branched saturated hydrocarbon group. As the saturated hydrocarbon group, a saturated hydrocarbon group having 2 to 9 carbon atoms is preferable. In the formula (B-2), n1 represents an integer of 2 to 10, preferably 2 to 6, and more preferably 2 or 3.

Specific examples of the compound represented by the formula (C-1) include 2-(2-vinyloxyethoxy)ethyl acrylate (VEER, manufactured by Nippon Shokubai Co., Ltd., viscosity (25° C.) 3.65 mPa·s), 2-(2-vinyl oxyethoxy)ethyl methacrylate (VEEM, manufactured by Nippon Shokubai Co., Ltd., viscosity (25° C.) 3.19 mPa·s), hexanediol diacrylate (viscosity (25° C.) 5 to 9 mPa·s), 3-methyl-1,5-pentanediol diacrylate (viscosity (25° C.) 4 to 8 mPa·s), neopentyl glycol diacrylate (viscosity (25° C.) 10 mPa·s), triethylene glycol diacrylate (viscosity (25° C.) 15 mPa·s), 1,3-butanediol diacrylate (viscosity (25° C.) 9 mPa·s), 1,4-butanediol diacrylate (viscosity (25° C.): 8 mPa·s), diethylene glycol diacrylate (viscosity (25° C.) 12 mPa·s), dipropylene glycol diacrylate (viscosity (25° C.) 11 mPa·s), and nonanediol diacrylate (viscosity (25° C.) 8 mPa·s).

Moreover, the component C is preferably a compound represented by the following formula (C-2). The compound represented by the formula (C-2) has a (meth)acrylate group and a vinyloxy group.

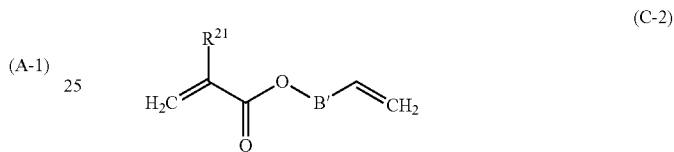
(C-2)

(wherein $R^{21}$ represents a hydrogen atom or a methyl group, and B' represents a group represented by the following formula (B'-1) or (B'-2)):

*—$R^{22}$—O—**  (B'-1)

*—$(CHR^{23}CHR^{24}$—O$)_{n2}$—**  (B'-2)

wherein $R^{22}$ represents a saturated hydrocarbon group having 2 to 12 carbon atoms, one of $R^{23}$ and $R^{24}$ represents a hydrogen atom and the other represents a hydrogen atom or a methyl group, and n2 represents an integer of 2 to 10), * represents the bonding position between the (meth)acryloxy group and B', and ** represents the bonding position between B' and the vinyl group.

In the formula (B'-1), $R^{22}$ has the same definition as Ru in the formula (B-1), and a preferable range thereof is also the same. Further, in the formula (B'-2), $R^{23}$ and $R^{24}$, and n2 have the same definitions as $R^{13}$ and $R^{14}$, and n1 in the formula (B-2), and preferable ranges thereof are also the same.

Among these, as the compound represented by the formula (C-2), 2-(2-vinyloxyethoxy)ethyl acrylate (VEEA, manufactured by Nippon Shokubai Co., Ltd., viscosity (25° C.) 3.65 mPa·s), 2-(2-vinyl oxyethoxy)ethyl methacrylate (VEEM, manufactured by Nippon Shokubai Co., Ltd., viscosity (25° C.) 3.19 mPa·s), 1,6-hexane glycol diacrylate (manufactured by Sartomer Japan Inc., viscosity (25° C.) 5 to 9 mPa·s), dipropylene glycol diacrylate (manufactured by Sartomer Japan Inc., viscosity (25° C.) 11 mPa·s), and PO-modified neopentyl glycol diacrylate (manufactured by Sartomer Japan Inc., viscosity (25° C.) 15 mPa·s) are preferable, 2-(2-vinyloxyethoxy)ethyl acrylate, 1,6-hexane glycol diacrylate, and dipropylene glycol diacrylate are more preferable, and 2-(2-vinyloxyethoxy)ethyl acrylate is particularly preferable.

The component C may be used singly or in combination of two or more kinds thereof.

The content of the component C with respect to the total amount of the ink composition is preferably from 0.1 to 10% by mass, more preferably from 0.1 to 5% by mass, even more preferably from 0.3 to 5% by mass, and particularly preferably from 0.5 to 3% by mass. Within the above ranges, the viscosity of the ink suitably decreases, and thus, dischargeability is excellent, and further, the adhesiveness and the heat resistance are improved.

(Component D) Polymerization Initiator

The ink composition of the present invention preferably includes (component D) a polymerization initiator.

The polymerization initiator is a compound that generates a polymerization initiating species by the irradiation of active energy rays, and any of known polymerization initiators may be suitably selected and used.

Here, the active energy rays are not particularly limited as long as they are capable of imparting energy capable of generating an initiating species in an ink composition by the irradiation of the rays, and examples thereof include α rays, γ rays, X rays, ultraviolet rays, infrared rays, visible light, and an electron beam. Among these, from the viewpoints of curing sensitivity and easiness of obtaining a device, ultraviolet rays and an electron beam are preferable, and ultraviolet rays are more preferable. Accordingly, the ink composition of the present invention is preferably one that is curable by irradiating ultraviolet rays as the active energy rays. A light source that generates ultraviolet rays is preferably one having a light emitting wavelength at 300 nm to 400 nm, and as the light source, a low-pressure mercury lamp, which is a known ultraviolet ray lamp, a high-pressure mercury lamp, a short arc discharge lamp, an ultraviolet ray-emitting diode, a semiconductor laser, a fluorescent lamp, or the like, may be used, and from a light amount or wavelength suitable for the initiator, a high-pressure mercury lamp or a metal halide lamp belonging to high-pressure discharge lamps, and a xenon lamp belonging to short arc discharge lamps are preferably used. In addition, from the viewpoints of saving energy, an ultraviolet ray-emitting diode is also preferably used.

Furthermore, examples of the polymerization initiator in the present invention include a compound that absorbs external energy such as active energy rays to generate a polymerization initiating species as well as a compound that absorbs a specific active energy ray to promote decomposition of the polymerization initiator (so-called a sensitizer).

(Component D-1) Radical Polymerization Initiator

As the (component D) polymerization initiator, a (D-1) radical polymerization initiator is preferable, and examples thereof include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having carbon-halogen bonds, and (m) alkylamine compounds.

As these radical polymerization initiators, the (a) to (m) compounds may be used singly or in combination of two or more kinds thereof.

Among these, the (a) aromatic ketones, the (b) acylphosphine compounds, and the (e) thio compounds are preferable, and acylphosphine compounds and thioxanthone compounds are more preferable. Preferable examples thereof include the compounds having a benzophenone skeleton or a thioxanthone skeleton, described in "RADIATION CURING IN POLYMER SCIENCE AND TECHNOLOGY", J. P. FOUASSIER, J. F. RABEK (1993), pp. 77 to 117. More preferable examples thereof include the α-thiobenzophenone compounds described in JP1972-6416B (JP-S47-6416B); the benzoin ether compounds described in JP1972-3981B (JP-S47-3981B); the α-substituted benzoin compounds described in JP1972-22326B (JP-S47-22326B); the benzoin derivatives described in JP1972-23664B (JP-S47-23664B); the aroylphosphonic esters described in JP1982-30704A (JP-S57-30704A); the dialkoxybenzophenones described in JP1985-26483B (JP-S60-26483B); the benzoin ethers described in JP1985-26403B (JP-S60-26403B) and JP1987-81345A (JP-S62-81345A); the α-aminobenzophenones described in JP1989-34242B (JP-H01-34242B), US4318791A and EP0284561B; p-di(dimethylaminobenzoyl)benzene described in JP1990-211452A (JP-H02-211452A); the thio-substituted aromatic ketones described in JP1986-194062A (JP-S61-194062A); the acylphosphine sulfides described in JP1990-9597B (JP-H02-9597B); the acylphosphines described in JP1990-9596B (JP-H02-9596B); the thioxanthones described in JP1988-61950B (JP-S63-61950B); and the coumarins described in JP1984-42864B (JP-S59-42864B).

Further, in the present invention, as the polymerization initiator, an acylphosphine compound is more preferably used; an acylphosphine oxide compound is even more preferably used; and a bisacylphosphine oxide compound is particularly preferably used.

Preferable examples of the acylphosphine compound include bis(2,4,6-trimethylbenzoyl)phenylphosphine oxide, bis(2,6-dimethoxybenzoyl)-2,4,4-trimethylpentylphenylphosphine oxide, and 2,4,6-trimethylbenzoyldiphenylphosphine oxide.

Examples of the sensitizer include polynuclear aromatic compounds (for example, pyrene, perylene, triphenylene, and 2-ethyl-9,10-dimethoxyanthracene), xanthenes (for example, fluorescein, eosin, erythrosine, rhodamine B, and rose bengal), cyanines (for example, thiacarbocyanine and oxacarbocyanine), merocyanines (for example, merocyanine and carbomerocyanine), thiazines (for example, thionine, methylene blue, and toluidine blue), acridines (for example, acridine orange, chloroflavin, and acriflavine), anthraquinones (for example, anthraquinone), squaryliums (for example, squarylium), coumarins (for example, 7-diethylamino-4-methylcoumarin), and thioxanthones (for example, thioxanthone, 2-isopropylthioxanthone, and 4-isopropylthioxanthone).

Among these, the ink composition of the present invention preferably includes a thioxanthone compound as the component D.

Furthermore, the sensitizer may be used singly or in combination of two or more kinds thereof.

The content of the polymerization initiator in the present invention is preferably from 1 to 50% by mass, more preferably from 2 to 40% by mass, and even more preferably from 3 to 20% by mass, with respect to the total mass of the ink composition.

(Component E) Resin Having Urethane Bond in Main Chain as well as Ethylenically Unsaturated Group in Side Chain and/or Terminal of Main Chain, and Siloxane Structure in Side Chain and/or Terminal of Main Chain The ink composition of the present invention preferably includes (component E) a resin having a urethane bond in the main chain as well as an ethylenically unsaturated group in a side chain and/or at a terminal of the main chain, and a siloxane structure in the side chain and/or at the terminal of the main chain.

Furthermore, the component E is appropriately also referred to as a "surface-segregated polymer". It is presumed that when the component E is unevenly distributed on the surface of an ink cured film, the film hardness, the stretchability at a high temperature, and the ink flow resistance are improved.

The component E has a urethane bond in the main chain. Further, the component E preferably has an ethylenically unsaturated group in the side chain and/or at the terminal of the main chain and an ethylenically unsaturated group at the terminal of the side chain and/or the terminal of the main chain, and more preferably has an ethylenically unsaturated group at the terminal of the side chain. In addition, the component E preferably has a group containing a (poly)siloxane structure in the side chain and/or at the terminal of the main chain, more preferably has a group having a (poly)siloxane structure at the terminal of a side chain and/or the terminal of a main chain, and even more preferably has a group including a (poly)siloxane structure at the terminal of a side chain.

Hereinafter, the main chain structure, the group including the (poly)siloxane structure, and the ethylenically unsaturated group, which constitute the component E, will be described.

<Main Chain Structure>

The component E is a so-called polyurethane resin containing a urethane bond (—NRCOO— or —OCONR—, in which R represents a hydrogen atom or an alkyl group having 1 to 6 carbon atoms, which may be substituted) in the main chain. Examples of the substituent which may be contained in the alkyl group include a halogen atom, a hydroxyl group, and an amino group. The main chain structure of the component E may form a polyurethane structure by a polyisocyanate component such as diisocyanate and a polyol component such as a diol being reacted.

Preferable specific examples of the polyisocyanate component which may form a polyurethane structure include tolylene diisocyanate, isophorone diisocyanate, hexamethylene diisocyanate, trimethylhexamethylene diisocyanate, norbornene diisocyanate, dicyclohexylmethane-4,4-diisocyanate, xylene diisocyanate, diphenylmethane-4,4-diisocyanate, and a dimer acid diisocyanate.

Examples of the polyol component which may form a polyurethane structure include ethylene glycol, polyethylene glycol, propylene glycol, polypropylene glycol, 1,4-butanediol, 2,3-butanediol, 1,3-butanediol, neopentyl glycol, methylpentanediol, 1,6-hexanediol, trimethylhexamethylenediol, 2-methyloctanediol, 1,9-nonanediol, 1,4-cyclohexanedimethanol, tricyclodecanedimethanol, polycaprolactone diol, polycarbonatediols, glycerin, trimethylolpropane, trimethyloloctane, pentaerythritol, and polytetramethylene glycol.

Among these, a polyol having a molecular weight of 4,000 or less is preferably used.

<Group Containing (Poly)Siloxane Structure>

The group containing a (poly)siloxane structure included in the component E (surface-segregated polymer) in the present invention is not particularly limited as long as it has an "—Si—O—Si—" structure, but it is preferably contained in at least one of the side chain and/or at the terminal of the main chain of the component E. Specifically, the component E preferably has a group represented by the formula (e2-1), or a group represented by the formula (e2-2).

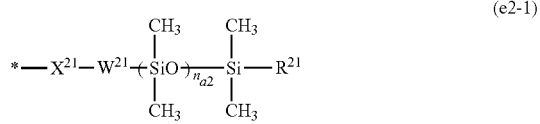
(e2-1)

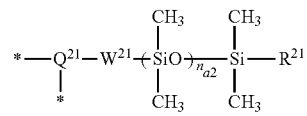
(e2-2)

In the formula (e2-1), $R^{21}$ represents an alkyl group or an aryl group, $W^{21}$ represents a divalent linking group, and $X^{21}$ represents any one of —O—, —S—, and —N($R^{24}$)—. Here, $R^{24}$ represents a hydrogen atom or an alkyl group having 1 to 4 carbon atoms. Further, $n_{a2}$ represents an integer of 5 to 100, and * represents a position linked to the main chain and/or the terminal of the main chain of a polymer.

The alkyl group of $R^{21}$ is preferably one having 1 to 12 carbon atoms, and may have either a linear structure or a branched structure. Specific examples thereof include a methyl group, an ethyl group, a propyl group, an isopropyl group, a butyl group, an isobutyl group, a sec-butyl group, and a t-butyl group. Further, it is more preferably an alkyl group having 1 to 6 carbon atoms, even more preferably an alkyl group having 1 to 4 carbon atoms, and particularly preferably a butyl group.

The aryl group of $R^{21}$ is preferably one having 6 to 20 carbon atoms, and more preferably one having 6 to 14. Specific examples of the aryl group of $R^{21}$ include a phenyl group, a biphenyl group, and a naphthyl group, and more preferably a phenyl group.

The divalent linking group represented by $W^{21}$ is preferably an alkylene group having 1 to 20 carbon atoms or an arylene group. The alkylene group may have either a linear structure or a branched structure. Further, it may have a substituent or may be unsubstituted. Examples of the substituent which may be included in the group include a halogen atom.

In a case where $W^{21}$ is an alkylene group having 1 to 20 carbon atoms, it is preferably unsubstituted, more preferably an unsubstituted alkylene group having 1 to 10 carbon atoms, and even more preferably an unsubstituted alkylene group having 1 to 4 carbon atoms. Specific examples of the alkylene group include a methylene group, an ethylene group, a propylene group, a butylene group, a pentylene group, a hexylene group, an octylene group, and a decylene group. These groups may have either a linear structure or a branched structure.

When $W^{21}$ is an arylene group, it is preferably an arylene group having 6 to 20 carbon atoms, and more preferably an arylene group having 6 to 12 carbon atoms. Specific examples thereof include a phenylene group, a biphenylene group, and a naphthylene group. Among these, a phenylene group is particularly preferable.

Furthermore, the divalent linking group represented by $W^{21}$ may have an imino bond (—NH—), an amide bond (—CONH—), an ester bond (—COO— or —OCO—), an ether bond (—O—), a sulfonamide bond (—NHSO$_2$— or —SO$_2$NH—), a urethane bond (—NHCOO— or —OCONH—), a ureylene bond (—NHCONH—), a carbonate bond (—OCOO—), or a group having a heterocycle (specifically, a group formed by the removal of two hydrogen atoms from a heterocycle such as triazine, isocyanuric acid, and piperazine), which are interposed therein as a bonding group.

Among these, as $W^{21}$, an unsubstituted alkylene group having 1 to 4 carbon atoms, or an unsubstituted alkylene group having 1 to 8 carbon atoms, containing an ether bond (—O—) as a bonding group is more preferable, and —CH$_2$CH$_2$—O—CH$_2$CH$_2$— is particularly preferable ** represents the bonding position.

$X^{21}$ is any group selected from —O—, —S—, and —N($R^{24}$)—. Here, $R^{24}$ represents a hydrogen atom, or an alkyl group having 1 to 4 carbon atoms, and the alkyl group may have either a linear structure or a branched structure. Specific examples thereof include a methyl group, an ethyl group, a propyl group, an isopropyl group, an n-butyl group, an isobutyl group, and a tert-butyl group. Among these, $R^{24}$ is preferably a hydrogen atom or a methyl group.

Furthermore, among these, $X^{21}$ is most preferably —O—.

In the formula (e2-2), $R^{21}$ represents an alkyl group or an aryl group, $W^{21}$ represents a divalent linking group, and $Q^{21}$ represents a trivalent linking group having any two groups selected from —O—, —S—, and —N($R^{24}$)—. Here, $R^{24}$ represents a hydrogen atom, or an alkyl group having 1 to 4 carbon atoms. Further, $n_{a2}$ represents an integer of 5 to 100, and * represents a position linked to the main chain and/or the terminal of the main chain of a polymer.

In the formula (e2-2), $R^{21}$, $W^{21}$, $R^{24}$, and $n_{a2}$ have the same definition as $R^{21}$, $W^{21}$, $R^{24}$, and $n_{a2}$ in the formula (e2-1).

$Q^{21}$ is a trivalent linking group having any two groups selected from —O—, —S—, and —N($R^{24}$)— at the end. As the trivalent linking group represented by $Q^{21}$, an alkanetriyl group having 1 to 20 carbon atoms (trivalent group formed by the removal of two hydrogen atoms from an alkyl group) or an arenetriyl group (trivalent group formed by the removal of two hydrogen atoms from an aryl group) is preferred. The alkanetriyl group may have either a linear structure or a branched structure. Further, it may have a substituent or may be unsubstituted. Examples of the substituent which may be contained include a halogen atom.

In a case where $Q^{21}$ is an alkanetriyl group having 1 to 20 carbon atoms, it is preferably unsubstituted, more preferably an unsubstituted alkanetriyl group having 1 to 10 carbon atoms, and even more preferably an unsubstituted alkanetriyl group having 1 to 4 carbon atoms. Specific examples of the alkanetriyl group include a methanetriyl group, an ethanetriyl group, a propanetriyl group, a butanetriyl group, a pentanetriyl group, a hexanetriyl group, an octanetriyl group, and a decanetriyl group. The alkanetriyl group may have either a linear structure or a branched structure, but an alkanetriyl group having a branched structure is more preferable.

In a case where $Q^{21}$ is an arenetriyl group, it is preferably an arenetriyl group having 6 to 20 carbon atoms, and more preferably an arenetriyl group having 6 to 12 carbon atoms. Specific examples thereof include a benzenetriyl group, a biphenyltriyl group, and a naphthalenetriyl group.

$Q^{21}$ may be either an alkanetriyl group or an arenetriyl group, and has any two groups selected from —O—, —S—, and —N($R^{24}$)—. These two groups may be placed at an arbitrary position of the alkanetriyl group or the arenetriyl group.

$Q^{21}$ is more preferably a trivalent linking group, which is a branched alkanetriyl group having 3 to 10 carbon atoms, and has at least two ether bonds (—O—) at the end and at least one single bond.

A specific method for introducing a group represented by the formula (e2-1) or the formula (e2-2) into the main chain and/or the terminal of the main chain of the component E will be described later, but a commercially available compound having a structure of the formula (e2-1) or the formula (e2-2) may be applied during the synthesis of the component E.

As a compound including the structure represented by the formula (e2-1) or the formula (e2-2), an alcohol compound, an amine compound, a thiol compound, or the like may be used, but the alcohol compound is preferable, and specifically, the compound represented by the formula (e2-3) or the formula (e2-4) is more preferable.

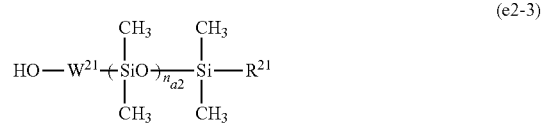

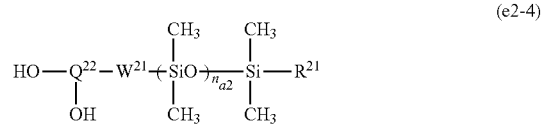

In the formula (e2-3) and the formula (e2-4), $W^{21}$, $R^{21}$, and $n_{a2}$ including the preferable ranges thereof have the same definition as in the formula (e2-1) and the formula (e2-2). In the formula (e2-4), $Q^{22}$ is a trivalent linking group, preferably an alkanetriyl group having 1 to 20 carbon atoms or an arenetriyl group, and may be either linear or branched, but preferably branched. A trivalent linking group linked to two ether bonds and one single bond is preferable.

Examples of the compounds represented by the formula (e2-3) and the formula (e2-4) include the following compounds (in the exemplary compounds, $n_{a2}$ is an integer of 5 to 100). However, the present invention is not limited thereto.

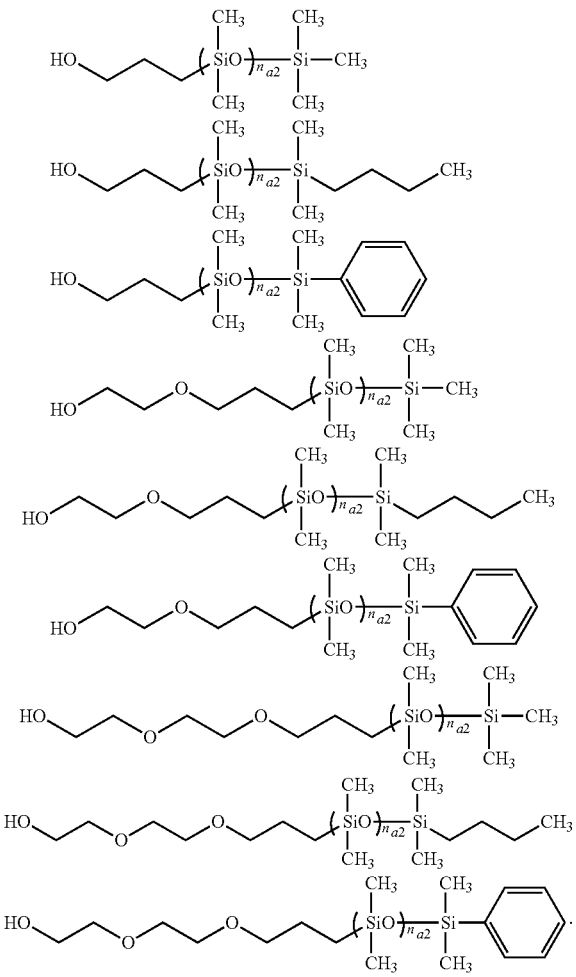

Furthermore, the alcohol compound represented by the formula (e2-3) or (e2-4) may be obtained as a commercially available product, and examples thereof include X-22-170BX, X-22-170DX, and X-22-173DX, all manufactured by Shin-Etsu Chemical Co., Ltd., and SILAPLANE FM-0411, FM-0421, FM-0425, FM-DA11, FM-DA21, and FM-DA26, all manufactured by Chisso Corporation.

In a case where a group containing a (poly)siloxane structure is introduced to the component E, it is preferably contained in the structure of the main chain and/or at least any one of the terminals of the main chain.

In a method for introducing a group containing a (poly) siloxane structure to the main chain, specifically, when the above-described polyisocyanate and a polyol are reacted with each other to obtain a polyurethane structure, a diol having a group containing a (poly)siloxane structure may be used as a raw material of a polyol.

As a method for introducing a group containing a (poly) siloxane structure to the terminal of the main chain, specifically, an alcohol compound having a polysiloxane structure may be suitably selected according to the structure to be introduced during the synthesis of the component E, and used as a polymerization terminator. Specific examples thereof include a monovalent alcohol compound having the group containing a (poly)siloxane structure as described above.

Specifically, first, when the above-described polyisocyanate and the polyol are reacted with each other to obtain a polyurethane structure, they are included in a synthesis system, and the reaction is performed such that the total moles of the isocyanate group in the system is in a small excess with respect to the total moles of the hydroxyl groups included, thereby obtaining a polymer having an isocyanate group at the end.

Subsequently, by reacting a monovalent alcohol compound having a group containing a (poly)siloxane structure with the isocyanate group formed at the terminal of the polymer, the (poly)siloxane structure may be introduced to the terminal of the main chain of the polymer. Further, how small the excess of the isocyanate group is made may be appropriately determined depending on the molecular weight of the component E to be formed.

<Ethylenically Unsaturated Group>

The component E has an ethylenically unsaturated group in a side chain and/or at the terminal of the main chain.

It is presumed that when the component E contains an ethylenically unsaturated group, the surface of the cured film of the ink composition is hardened and may be coated with the component E. It is presumed that as a result, an ink composition which is excellent in film hardness, stretchability at a high temperature, and ink flow resistance may be provided.

Examples of the ethylenically unsaturated group include unsaturated carboxylic ester groups such as an acrylic ester group, a methacrylic ester group, an itaconic ester group, a crotonic ester group, an isocrotonic ester group, and a maleic ester group, and radically polymerizable groups such as a styrene group. Among these, an acrylic ester group and a methacrylic ester group (that is, a (meth)acrylic ester group) are preferable.

Examples of the method for introducing the ethylenically unsaturated group to the component E include a method in which monomers blocking a reaction using a protective group for a double bond of an ethylenically unsaturated group are used, the monomers are copolymerized and the protective group is removed to form a double bond, and a method in which a low-molecular compound having an ethylenically unsaturated group is introduced to a polymer to be a starting raw material for the component E in the polymer reaction.

As the component E, a resin represented by the formulae (E-1) to (E-3) is more preferably used.

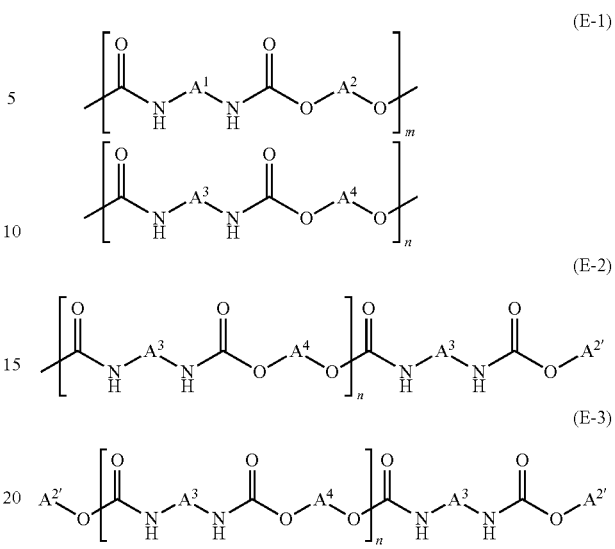

in the formulae (E-1) to (E-3), $A^1$ and $A^3$ each independently represent an alkylene group having 5 to 15 carbon atoms, a divalent linking group containing an aromatic hydrocarbon ring, or a divalent linking group containing an aliphatic hydrocarbon ring, $A^2$ represents a divalent linking group having a (poly)siloxane structure in the side chain, $A^{2'}$ represents a monovalent linking group having a polysiloxane structure, and $A^4$ represents a divalent linking group having an ethylenically unsaturated group in a side chain. m and n represent an integer satisfying the relationship of m:n=100:1 to 1:100.

In the formulae (E-1) to (E-3), $A^1$ and $A^3$ each represent a mother structure, to which an isocyanate group of a diisocyanate compound capable of forming a polyurethane structure described in the main chain structure of the component E is attached. Examples of the preferable structure of $A^1$ and $A^3$ include mother structures, to which an isocyanate group of the diisocyanate compound exemplified as the preferable specific examples of the diisocyanate compound capable of forming a polyurethane structure described in the main chain structure of the component E is attached.

The alkylene group having 5 to 15 carbon atoms may be any one of linear, branched, and cyclic alkylene groups, but linear alkylene groups are preferable. The alkylene group preferably has 5 to 12 carbon atoms, and more preferably 6 to 10 carbon atoms.

The divalent linking group containing the aromatic hydrocarbon ring is preferably a group formed by the removal of two hydrogen atoms from an aromatic hydrocarbon compound including at least one aromatic hydrocarbon ring and at least one alkyl group having 1 to 4 carbon atoms. Examples of the aromatic hydrocarbon ring include a benzene ring and a naphthalene ring. Examples of the aromatic hydrocarbon compound including the aromatic hydrocarbon ring and the alkyl group having 1 to 4 carbon atoms include m-xylene, p-xylene, toluene, and diphenylmethane.

The divalent linking group containing the aliphatic hydrocarbon ring is preferably a group formed by the removal of two hydrogen atoms from an aliphatic hydrocarbon compound including at least one aliphatic hydrocarbon ring and at least one alkyl group having 1 to 4 carbon atoms. The aliphatic hydrocarbon ring is preferably a cyclohexane ring. Examples of the aliphatic hydrocarbon ring including at least one aliphatic hydrocarbon ring and at least one alkyl group having 1 to 4 carbon atoms include dicyclcohexylmethane, 1,1,3,3-tetramethylcyclohexane, and norbornane.

In the formula (E-1), $A^2$ preferably represents a divalent linking group having a (poly)siloxane structure in a side chain, and represents, in the formula (e2-2) as a preferable example of a group having a (poly)siloxane structure of the component E, a group having a (poly)siloxane structure formed by the removal of two ether bonds in a case where $Q^{21}$ has at least two ether bonds.

In the formulae (E-2) and (E-3), $A^{2'}$ represents a monovalent group having a polysiloxane structure, and in the formula (e2-1) which is a preferable example of the group having a polysiloxane structure of the component E, $A^{2'}$ preferably represents a group having a polysiloxane structure excluding an ether bond in a case where $X^{21}$ is an ether bond (—O—).

In addition, in a case where the component E is represented by the formula (E-2), it has a group having a polysiloxane structure at one terminal of the main chain, and in a case where the component E is represented by the formula (E-3), it has a group having a polysiloxane structure at both terminals of the main chain.

In the formulae (E-1) to (E-3), $A^4$ represents a divalent linking group having an ethylenically unsaturated group in a side chain, and is not particularly limited, but is more preferably a group represented by the formula (e4-1).

In the formula (e4-1), $W^{21}$ and $Q^{21}$ have the same definitions as $W^{21}$ and $Q^{21}$ in the formula (e2-2). In the group represented by the formula (e4-1), $W^{21}$ is preferably an ester bond and $Q^{21}$ is preferably a trivalent linking group, which is a branched alkylene group having 3 to 10 carbon atoms, and has at least two ether groups at the end and at least one single bond.

Specifically, it represents a structure formed by the removal of two hydroxyl groups from a divalent or higher valent alcohol compound having an ethylenically unsaturated group. Preferable examples of the ethylenically unsaturated group include the groups exemplified above in the description of the ethylenically unsaturated group of the component E.

The divalent or higher valent alcohol compound having an ethylenically unsaturated group has, for example, 2,2-dimethyl-1,3-dioxolane-4-methanol (manufactured by Wako Pure Chemical Industries, Ltd.), in which an ethylenically unsaturated group is protected with an acetal group, as a starting raw material, and formation of (meth)acryloyl, introduction of a styryl group, and vinyletherification are carried out with reference to Tetrahedron Letters, 1985, 26, 3095, Angewandte Chemie, 2007, 119, 4229, J. Am. Chem. Soc., 2002, 124, 1590, and then deacetylation is carried out using hydrogen chloride (methanol solution) or the like to obtain a diol having an ethylenically unsaturated group to be a urethane raw material.

Preferable specific examples of the divalent or higher valent alcohol having an ethylenically unsaturated group include a compound represented by the formula (e4-2). Examples of the compound represented by the formula (e4-2) include, as a commercially available product, Blemmer GLM manufactured by NOF Corporation.

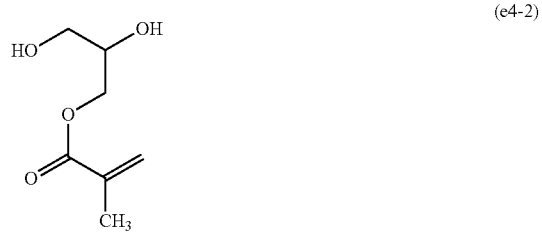

In the formulae (E-2) and (E-3), in a case where a monovalent alcohol having a (poly)siloxane structure is used as a raw material, a structure such as those of the formula (Ed-1) or the formula (Ed-2) added to the terminal of the main chain may be formed.

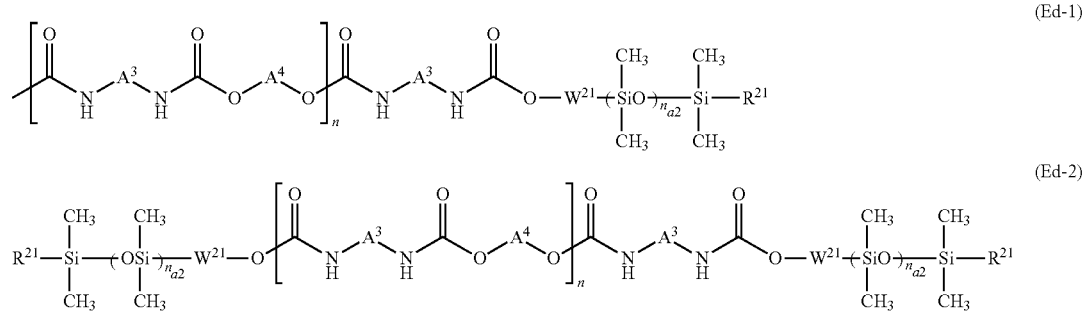

in the formulae (Ed-1) and (Ed-2), $A^3$, $A^4$, and n have the same definition as $A^3$, $A^4$, and n in the formulae (E-2) and (E-3), and $W^{21}$, $R^{21}$, and $n_{a2}$ have the same definitions as $W^{21}$, $R^{21}$, and $n_{a2}$ in the formula (e2-3).

Furthermore, the group at the terminal of the main chain of the polymer represented by the formulae (E-1) to (E-3) may contain various groups through a method for synthesizing polymers. By adding a well-known polymerization terminator, the end group may have a structure of an isocyanate group, an amide group, a hydroxyl group, or the like, and specific examples thereof include the structures represented by the formulae (Ee-1) to (Ee-4), but are not limited thereto.

In the formulae (Ee-1) to (Ee-4), $A^1$ to $A^4$ have the same definitions as $A^1$ to $A^4$ in the formula (E-1). The double wavy line part is a bonding position with the residual part of a resin of the formula (E-1).

For the terminals of the polymer of the formula (E-1), both the ends may have the same or different structures.

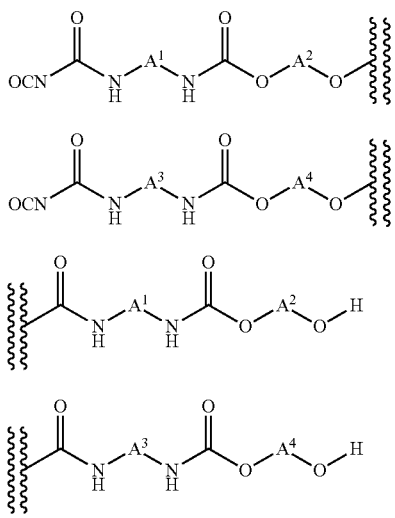

(Ee-1)

(Ee-2)

(Ee-3)

(Ee-4)

In the formula (E-1), m and n represent an integer satisfying the relationship of m:n=100:1 to 1:100. Further, m and n represent a molar ratio of the repeating units of the component E. They preferably satisfy the relationship of m:n=0.1:99.9 to 10:90, and more preferably 0.5:99.5 to 5:95.

Furthermore, the group at the terminal of the main chain opposite to $A^{2'}$ of the polymer represented by the formula (E-2) may contain various groups through a method for synthesizing a polymer. By adding a well-known polymerization terminator, the group at the end may have a structure of an isocyanate group, an amide group, a hydroxyl group, or the like, and specific examples thereof include the structures represented by the formulae (Ee-2) and (Ee-4) above, but are not limited thereto.

In the formulae (Ee-2) and (Ee-4), $A^3$ and $A^4$ have the same definitions as A1 to A4 in the formula (E-2). The double wavy line part is a bonding position with the residual part of the resin of the formula (E-2).

Hereinafter, preferable specific examples of the polymer of the component E in the present invention are shown in Tables 1 and 2. Further, the present invention is not limited to these specific examples in any way.

In Table 1, $A^1$ to $A^4$ and $A^{2'}$ represent $A^1$ to $A^4$ and $A^{2'}$ in the formulae (E-1) to (E-3), respectively. * represents the bonding position.

TABLE 1

| Polymer No. | Weight average molecular weight | | Diisocyanate-derived moiety *—C(=O)—N(H)—A¹(or A³)—N(H)—C(=O)—* |
|---|---|---|---|
| 1 | 30,000 | Structure | [p-xylylene diurea structure] |
| | | Molar ratio | 50 |
| 2 | 25,000 | Structure | [p-xylylene diurea structure] |
| | | Molar ratio | 50 |
| 3 | 20,000 | Structure | [p-xylylene diurea structure] |
| | | Molar ratio | 50 |
| 4 | 30,000 | Structure | [p-xylylene diurea structure] |
| | | Molar ratio | 50 |

TABLE 1-continued

| | | | |
|---|---|---|---|
| 5 | 25,000 | Structure | ![structure: *-C(=O)-NH-CH2-C6H4-CH2-NH-C(=O)-*] |
| | | Molar ratio | 50 |
| 6 | 35,000 | Structure | ![structure: *-C(=O)-NH-CH2-C6H4-CH2-NH-C(=O)-*] |
| | | Molar ratio | 50 |
| 7 | 30,000 | Structure | ![structure: *-C(=O)-NH-(cyclohexyl)-CH2-(cyclohexyl)-NH-C(=O)-*] |
| | | Molar ratio | 50 |
| 8 | 30,000 | Structure | ![structure: *-C(=O)-NH-(cyclohexyl)-CH2-(cyclohexyl)-NH-C(=O)-*] |
| | | Molar ratio | 50 |
| 9 | 30,000 | Structure | ![structure: *-C(=O)-NH-(cyclohexyl)-CH2-(cyclohexyl)-NH-C(=O)-*] |
| | | Molar ratio | 50 |
| 10 | 30,000 | Structure | ![structure: *-C(=O)-NH-(cyclohexyl)-CH2-(cyclohexyl)-NH-C(=O)-*] |
| | | Molar ratio | 50 |
| 11 | 30,000 | Structure | ![structure: *-C(=O)-NH-(cyclohexyl)-CH2-(cyclohexyl)-NH-C(=O)-*] |
| | | Molar ratio | 50 |
| 12 | 30,000 | Structure | ![structure: *-C(=O)-NH-(cyclohexyl)-CH2-(cyclohexyl)-NH-C(=O)-*] |
| | | Molar ratio | 50 |
| 13 | 30,000 | Structure | ![structure: *-C(=O)-NH-(methylphenylene)-NH-C(=O)-*, with CH3 substituent] |
| | | Molar ratio | 50 |
| 14 | 30,000 | Structure | ![structure: *-C(=O)-NH-(methylphenylene)-NH-C(=O)-*, with CH3 substituent] |
| | | Molar ratio | 50 |

TABLE 1-continued
| | | | | |
|---|---|---|---|---|
| 15 | 30,000 | Structure | | 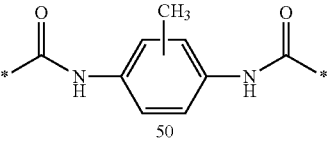 |
| | | Molar ratio | | 50 |
| 16 | 30,000 | Structure | | 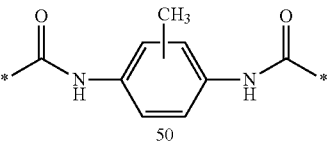 |
| | | Molar ratio | | 50 |
| 17 | 30,000 | Structure | | 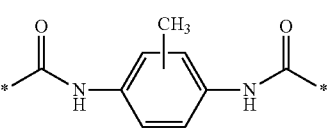 |
| | | Molar ratio | | 50 |
| 18 | 30,000 | Structure | | 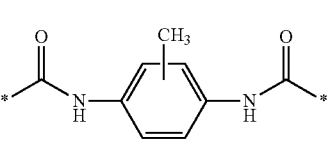 |
| | | Molar ratio | | 50 |
| | Weight average | | Diol-derived moiety | |
|---|---|---|---|---|
| Polymer No. | molecular weight | | Ethylenically unsaturated group *—O—A$^4$—O—* | Polysiloxane structure *—O—A$^2$—O—* or *—O—A$^{2*}$ |
| 1 | 30,000 | Structure | 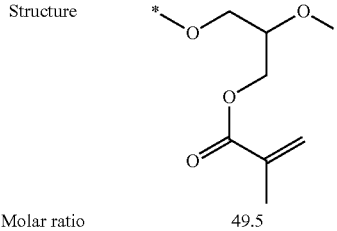 | 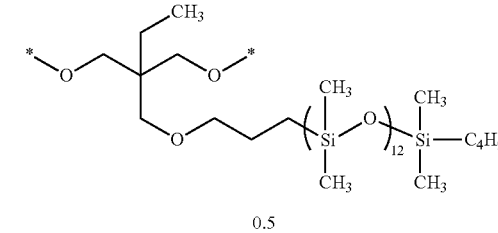 |
| | | Molar ratio | 49.5 | 0.5 |
| 2 | 25,000 | Structure | 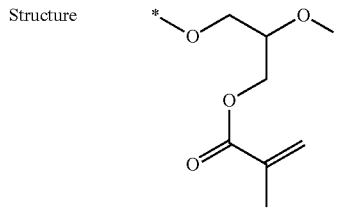 | 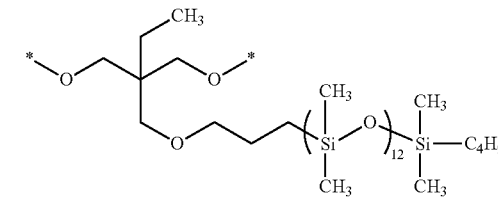 |
| | | Molar ratio | 49 | 1 |
| 3 | 20,000 | Structure | 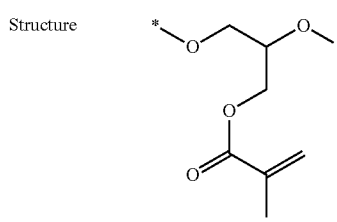 | 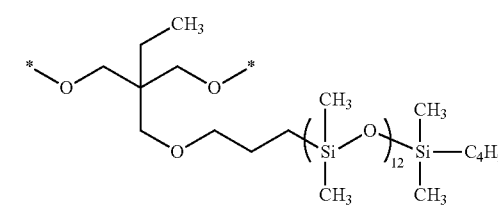 |
| | | Molar ratio | 48 | 2 |

TABLE 1-continued
| | | | | |
|---|---|---|---|---|
| 4 | 30,000 | Structure | 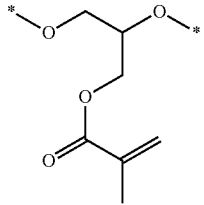 [SMILES: *OCC(COC(=O)C(=C)C)O*] | 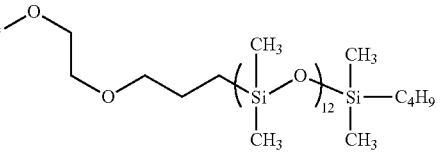 |
| | | Molar ratio | 49.5 | 0.5 |
| 5 | 25,000 | Structure | 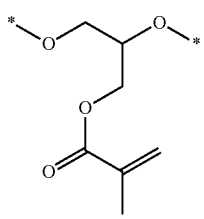 [SMILES: *OCC(COC(=O)C(=C)C)O*] | 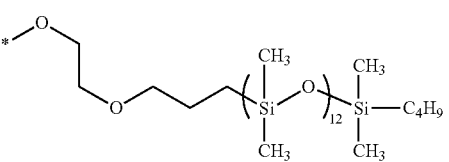 |
| | | Molar ratio | 49 | 1 |
| 6 | 35,000 | Structure | 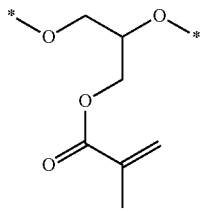 [SMILES: *OCC(COC(=O)C(=C)C)O*] | 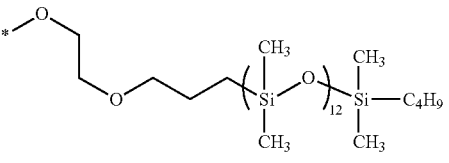 |
| | | Molar ratio | 48 | 2 |
| 7 | 30,000 | Structure | 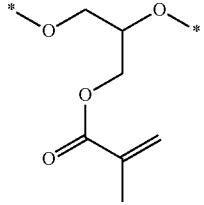 [SMILES: *OCC(COC(=O)C(=C)C)O*] | 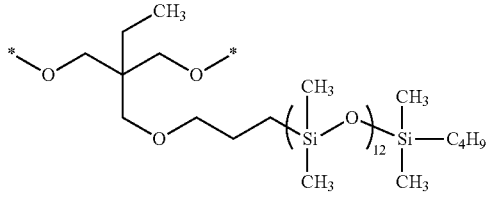 |
| | | Molar ratio | 49.5 | 0.5 |
| 8 | 30,000 | Structure | 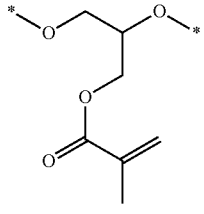 [SMILES: *OCC(COC(=O)C(=C)C)O*] | 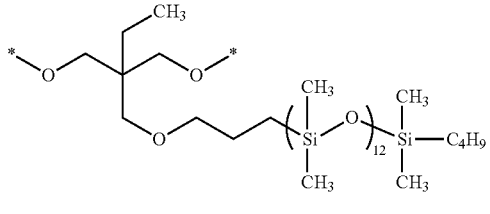 |
| | | Molar ratio | 49 | 1 |
| 9 | 30,000 | Structure | 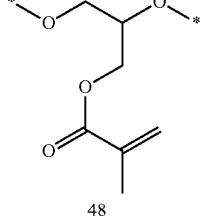 | 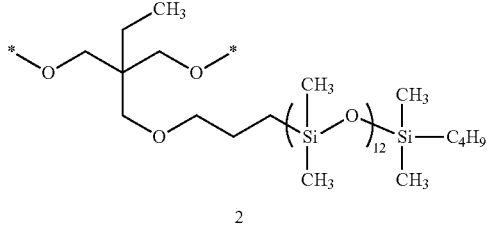 |
| | | Molar ratio | 48 | 2 |

TABLE 1-continued
| | | | | |
|---|---|---|---|---|
| 10 | 30,000 | Structure | 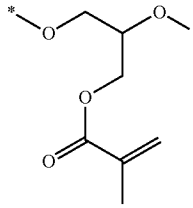 | 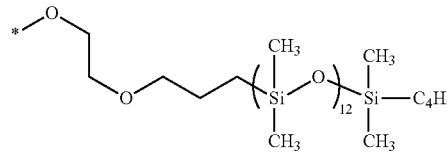 |
| | | Molar ratio | 49.5 | 0.5 |
| 11 | 30,000 | Structure | 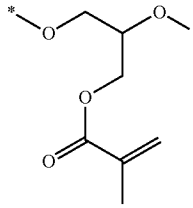 | 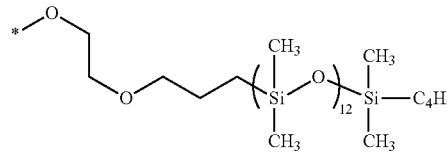 |
| | | Molar ratio | 49 | 1 |
| 12 | 30,000 | Structure | 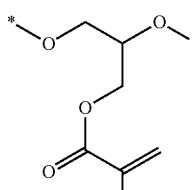 | 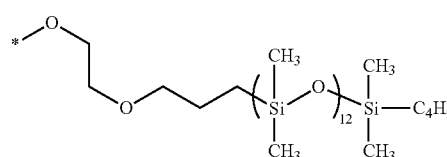 |
| | | Molar ratio | 48 | 2 |
| 13 | 30,000 | Structure | 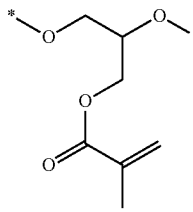 | 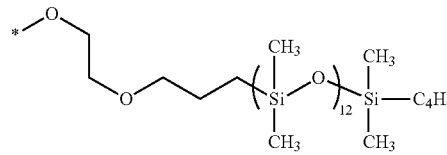 |
| | | Molar ratio | 49.5 | 0.5 |
| 14 | 30,000 | Structure | 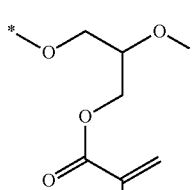 | 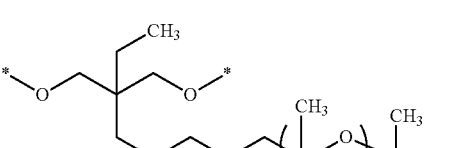 |
| | | Molar ratio | 49 | 1 |
| 15 | 30,000 | Structure | 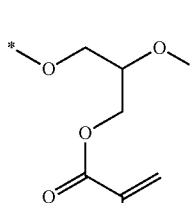 | 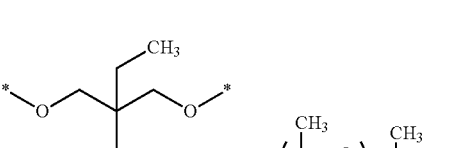 |
| | | Molar ratio | 48 | 2 |

TABLE 1-continued

| 16 | 30,000 | Structure | (glycerol methacrylate structure) | (PDMS-siloxane structure with 12 repeat units) |
|---|---|---|---|---|
|  |  | Molar ratio | 49.5 | 0.5 |
| 17 | 30,000 | Structure | (glycerol methacrylate structure) | (PDMS-siloxane structure with 12 repeat units) |
|  |  | Molar ratio | 49 | 1 |
| 18 | 30,000 | Structure | (glycerol methacrylate structure) | (PDMS-siloxane structure with 12 repeat units) |
|  |  | Molar ratio | 48 | 2 |

TABLE 2

| Polymer No. | Weight average molecular weight | | Diisocyanate-derived moiety $*-\underset{\underset{O}{\parallel}}{C}-\underset{H}{N}-A^1(\text{or }A^3)-\underset{H}{N}-\underset{\underset{O}{\parallel}}{C}-*$ |
|---|---|---|---|
| 19 | 30,000 | Structure | (MDI-derived urea structure) |
|  |  | Molar ratio | 50 |
| 20 | 30,000 | Structure | (MDI-derived urea structure) |
|  |  | Molar ratio | 50 |
| 21 | 30,000 | Structure | (MDI-derived urea structure) |
|  |  | Molar ratio | 50 |
| 22 | 30,000 | Structure | (MDI-derived urea structure) |
|  |  | Molar ratio | 50 |

TABLE 2-continued

| | | | |
|---|---|---|---|
| 23 | 30,000 | Structure | (structure: *-C(O)-NH-C6H4-CH2-C6H4-NH-C(O)-*) |
| | | Molar ratio | 50 |
| 24 | 20,000 | Structure | (structure: *-C(O)-NH-C6H4-CH2-C6H4-NH-C(O)-*) |
| | | Molar ratio | 50 |
| 25 | 30,000 | Structure | (structure: *-NH-(CH2)n-NH-C(O)-*) |
| | | Molar ratio | 50 |
| 26 | 30,000 | Structure | (structure: *-NH-(CH2)n-NH-C(O)-*) |
| | | Molar ratio | 50 |
| 27 | 30,000 | Structure | (structure: *-NH-(CH2)n-NH-C(O)-*) |
| | | Molar ratio | 50 |
| 28 | 30,000 | Structure | (structure: *-NH-(CH2)n-NH-C(O)-*) |
| | | Molar ratio | 50 |
| 29 | 30,000 | Structure | (structure: *-NH-(CH2)n-NH-C(O)-*) |
| | | Molar ratio | 50 |
| 30 | 20,000 | Structure | (structure: *-NH-(CH2)n-NH-C(O)-*) |
| | | Molar ratio | 50 |
| 31 | 30,000 | Structure | (isophorone diamine-based diamide structure) |
| | | Molar ratio | 50 |

TABLE 2-continued

| Polymer No. | Weight average molecular weight | | Structure | Molar ratio |
|---|---|---|---|---|
| 32 | 30,000 | Structure | *—C(=O)—NH—CH₂—[3,3,5-trimethylcyclohexyl]—NH—C(=O)—* (isophorone diamine-derived diamide) | |
| | | Molar ratio | | 50 |
| 33 | 30,000 | Structure | *—C(=O)—NH—CH₂—[3,3,5-trimethylcyclohexyl]—NH—C(=O)—* | |
| | | Molar ratio | | 50 |
| 34 | 30,000 | Structure | *—C(=O)—NH—CH₂—[3,3,5-trimethylcyclohexyl]—NH—C(=O)—* | |
| | | Molar ratio | | 50 |
| 35 | 30,000 | Structure | *—C(=O)—NH—CH₂—[3,3,5-trimethylcyclohexyl]—NH—C(=O)—* | |
| | | Molar ratio | | 50 |
| 36 | 30,000 | Structure | *—C(=O)—NH—CH₂—[3,3,5-trimethylcyclohexyl]—NH—C(=O)—* | |
| | | Molar ratio | | 50 |

| | Weight average | Diol-derived moiety | |
|---|---|---|---|
| Polymer No. | molecular weight | Ethylenically unsaturated group *—O—A⁴—O—* | Polysiloxane structure *—O—A²—O—* or *—O—A²* |
| 19 | 30,000 | Structure: *—O—CH₂—CH(O—*)—CH₂—O—C(=O)—C(CH₃)=CH₂ (glycerol methacrylate) | Structure: *—O—CH₂—C(CH₂CH₃)(CH₂—O—*)—CH₂—O—(CH₂)₃—Si(CH₃)₂—[O—Si(CH₃)₂]₁₂—C₄H₉ |
| | | Molar ratio: 49.5 | Molar ratio: 0.5 |

TABLE 2-continued
| | | | | |
|---|---|---|---|---|
| 20 | 30,000 | Structure | 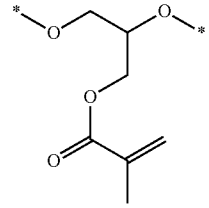 [SMILES: *OCC(COC(=O)C(=C)C)O*] | 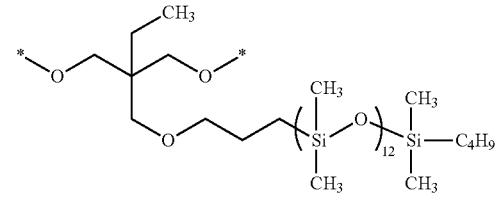 |
| | | Molar ratio | 49 | 1 |
| 21 | 30,000 | Structure | 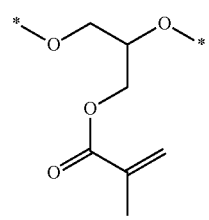 [SMILES: *OCC(COC(=O)C(=C)C)O*] | 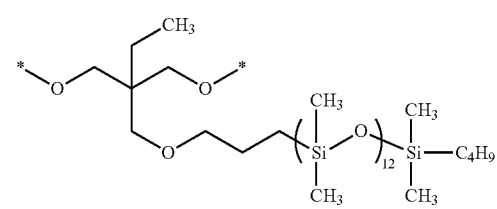 |
| | | Molar ratio | 48 | 2 |
| 22 | 30,000 | Structure | 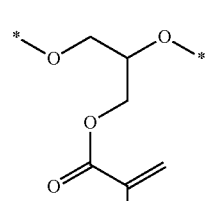 | 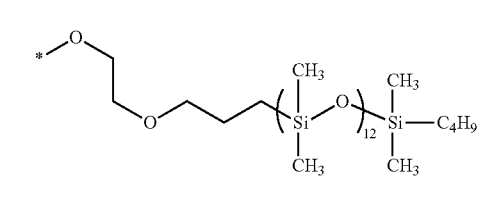 |
| | | Molar ratio | 48.5 | 0.5 |
| 23 | 30,000 | Structure | 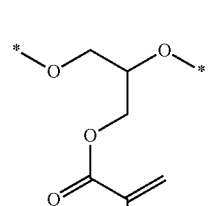 | 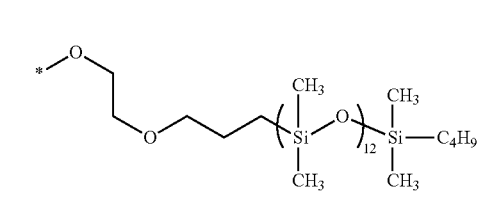 |
| | | Molar ratio | 49 | 1 |
| 24 | 20,000 | Structure | 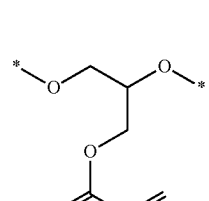 | 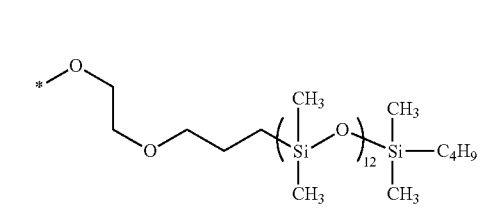 |
| | | Molar ratio | 48 | 2 |
| 25 | 30,000 | Structure | 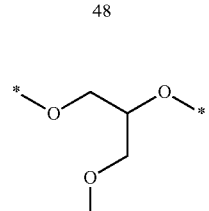 | 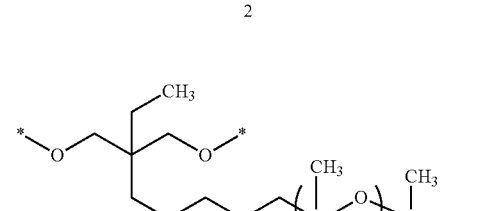 |
| | | Molar ratio | 49.5 | 0.5 |

TABLE 2-continued
| | | | | |
|---|---|---|---|---|
| 26 | 30,000 | Structure | 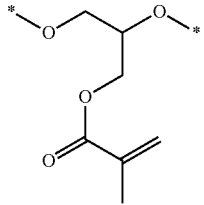 [SMILES: *OCC(COC(=O)C(=C)C)O*] | 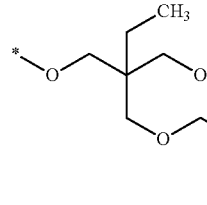 |
| | | Molar ratio | 49 | 1 |
| 27 | 30,000 | Structure | 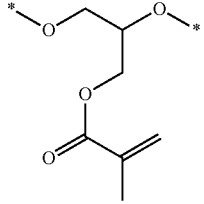 [SMILES: *OCC(COC(=O)C(=C)C)O*] | 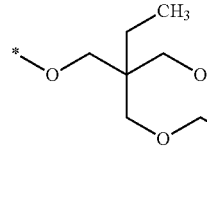 |
| | | Molar ratio | 48 | 2 |
| 28 | 30,000 | Structure | 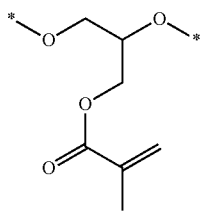 [SMILES: *OCC(COC(=O)C(=C)C)O*] | 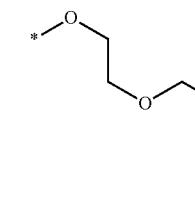 |
| | | Molar ratio | 49.5 | 0.5 |
| 29 | 30,000 | Structure | 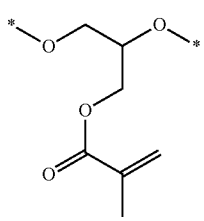 [SMILES: *OCC(COC(=O)C(=C)C)O*] | 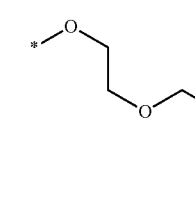 |
| | | Molar ratio | 49 | 1 |
| 30 | 20,000 | Structure | 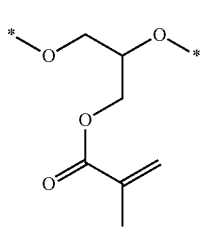 [SMILES: *OCC(COC(=O)C(=C)C)O*] | 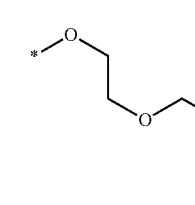 |
| | | Molar ratio | 48 | 2 |
| 31 | 30,000 | Structure | 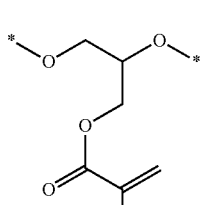 | 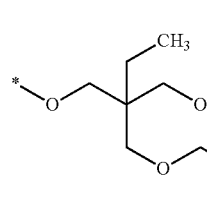 |
| | | Molar ratio | 49.5 | 0.5 |

TABLE 2-continued

| | | | | |
|---|---|---|---|---|
| 32 | 30,000 | Structure | (glycerol methacrylate unit) | (pentaerythritol-based siloxane unit with 12 Si-O repeats, C$_4$H$_9$ terminus) |
| | | Molar ratio | 49 | 1 |
| 33 | 30,000 | Structure | (glycerol methacrylate unit) | (pentaerythritol-based siloxane unit with 12 Si-O repeats, C$_4$H$_9$ terminus) |
| | | Molar ratio | 48 | 2 |
| 34 | 30,000 | Structure | (glycerol methacrylate unit) | (ethylene glycol propyl siloxane unit with 12 Si-O repeats, C$_4$H$_9$ terminus) |
| | | Molar ratio | 49.5 | 0.5 |
| 35 | 30,000 | Structure | (glycerol methacrylate unit) | (ethylene glycol propyl siloxane unit with 12 Si-O repeats, C$_4$H$_9$ terminus) |
| | | Molar ratio | 49 | 1 |
| 36 | 30,000 | Structure | (glycerol methacrylate unit) | (ethylene glycol propyl siloxane unit with 12 Si-O repeats, C$_4$H$_9$ terminus) |
| | | Molar ratio | 48 | 2 |

Furthermore, the component E may be used singly or in combination of two or more kinds thereof.

The weight average molecular weight of the component E is preferably from 5,000 to 200,000, more preferably from 8,000 to 150,000, and even more preferably from 10,000 to 100,000

Furthermore, the content of the component E contained in the ink composition of the present invention is preferably from 0.1 to 10% by mass, preferably from 0.1 to 5% by mass, and even more preferably from 0.2 to 3% by mass, with respect to the total mass of the ink composition.

<Other Polyfunctional Radically Polymerizable Monomer>

The ink composition of the present invention may include polyfunctional radically polymerizable monomers other than the component B, the component C, and the component E as the radically polymerizable compound.

Preferable examples of the other polyfunctional radically polymerizable monomers include ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol diacrylate, pentaerythritol tri(meth)acrylate, pentaerythritol tetra(meth)acrylate, dipentaerythritol tetra(meth)acrylate, trimethylolethane tri(meth)acrylate, trimethylolpropane tri(meth)acrylate, tetramethylolmethane tetra(meth)acrylate, oligoester (meth)acrylate, and 2,2-bis(4-(meth)acryloxypolyethoxyphenyl)propane.

Furthermore, in the ink composition of the present invention, in a case where the other polyfunctional radically polymerizable monomers are used, these may be used singly or in combination of two or more kinds thereof.

It is preferable that the polyfunctional radically polymerizable monomers in the ink composition of the present invention be only the component B, the component C and the component E.

The total content of the radically polymerizable monomers including the component A to the component C, and the component E in the ink composition of the present invention is preferably from 70 to 98% by mass, and more preferably from 71 to 95% by mass, with respect to the total amount of the ink composition. Within the above ranges, stretchability and curability are excellent.

(Component F) Surfactant

A (component F) surfactant may be added to the ink composition of the present invention in order to impart dischargeability stable for a long period of time.

Examples of the surfactant include those described in JP1987-173463A) (JP-S62-173463 A) and JP1987-183457A (JP-S62-183457A). Examples thereof include anionic surfactants such as dialkylsulfosuccinic acid salts, alkylnaphthalene sulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. Further, an organic fluoro compound may be used instead of the surfactant. The organic fluoro compound is preferably hydrophobic. Examples of the organic fluoro compound include fluorine-based surfactants, oil-like fluorine-based compounds (for example, a fluorine oil), solid fluorine compound resins (for example, a tetrafluoroethylene resin), and those described in JP1982-9053B (JP-S57-9053B) (paragraphs 8 to 17) and JP1987-135826A (JP-S62-135826A).

The content of the surfactant in the ink composition of the present invention is appropriately chosen according to the intended use, but is preferably from 0.0001 to 1% by mass, with respect to the total mass of the ink composition weight.

(Component G) Colorant

The ink composition of the present invention preferably includes (component G) a colorant in order to improve the visibility of the image part formed. The coloring agent is not particularly limited, but pigments and oil-soluble dyes having excellent weather resistance and rich color reproducibility are preferable, and it is possible to make an arbitrary selection from well-known colorants such as a soluble dye. From the viewpoint of not deteriorating the sensitivity of the curing reaction by active energy rays, a compound which does not function as a polymerization inhibitor is preferably selected.

The pigment which can be used in the present invention is not particularly limited, but, for example, the following numbered organic or inorganic pigments described in the Color Index may be used.

As red or magenta pigments, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, Pigment Orange 13, 16, 20, 36, as the blue or cyan pigment, Pigment Blue 1, 15, 15:1, 15:2, 15:3, 15:4, 15:6, 16, 17-1, 22, 27, 28, 29, 36, and 60, as the green pigment, Pigment Green 7, 26, 36, and 50, as the yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, and 193, as the black pigment, Pigment Black 7, 28, and 26, as the white pigment, Pigment White 6, 18, and 21, or the like may be used according to the purpose.

In the present invention, it is possible to use a disperse dye in a range for being dissolved in a non-water-miscible organic solvent. The disperse dyes generally include water-soluble dyes, but in the present invention, these are preferably used in a range for being dissolved in a non-water-miscible organic solvent.

Preferable specific examples of the disperse dye include C. I. Disperse Yellow 5, 42, 54, 64, 79, 82, 83, 93, 99, 100, 119, 122, 124, 126, 160, 184:1, 186, 198, 199, 201, 204, 224, and 237; C. I. Disperse Orange 13, 29, 31:1, 33, 49, 54, 55, 66, 73, 118, 119, and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C. I. Disperse Green 6:1 and 9.

It is preferable that the colorant be suitably dispersed in the ink composition after being added to the ink composition. For the dispersion of the colorant, it is possible to use various dispersion apparatuses such as, for example, a ball mill, a sand mill, an attritor, a roll mill, an agitator, a Henschel mixer, a colloid mill, an ultrasonic homogenizer, a pearl mill, a wet jet mill, and a paint shaker.

The colorant may be added directly with each component during the production of the ink composition. In addition, in order to improve dispersibility, it may be added in advance to a solvent or a dispersion medium such as the polymerizable compound used in the present invention and blended after uniform dispersion or dissolution.

In the present invention, in order to avoid the problems of the deterioration of solvent resistance when the solvent remains in the cured image and of VOC (Volatile Organic Compounds) of the remaining solvent, the colorant is preferably added in advance to the dispersion medium such as the polymerizable compound, and blended. In addition, when considering only the viewpoint of dispersion suitability, as the polymerizable compound to be used for the addition of the colorant, a monomer with low viscosity is preferably selected. One kind or two or more kinds of colorants may be suitably selected and used, depending on the intended use of the ink composition.

In addition, when using a colorant such as a pigment still existing as a solid in the ink composition, it is preferable to set the colorant, dispersant, selection of the dispersion medium, dispersion conditions, and filtration conditions so that the average particle diameter of the colorant particles is preferably from 0.005 to 0.5 µm, more preferably from 0.01 to 0.45 µm, and even more preferably from 0.015 to 0.4 µm. According to this particle diameter management, clogging of the head nozzle is suppressed, and it is possible to maintain storage stability, transparency, and curing sensitivity of the ink composition, which is therefore preferable.

The content of the colorant in the ink composition is appropriately selected according to the color and intended purpose, but is preferably from 0.01 to 30% by mass with respect to the total mass of the ink composition.

(Component H) Dispersant

The ink composition of the present invention preferably contains a dispersant. In particular, in a case of using a pigment, the ink composition preferably contains (component H) a dispersant in order to stably disperse the pigment in the ink composition. As the dispersant, a polymeric dispersant is preferable. Further, the "polymeric dispersant" in the present invention means a dispersant having a weight average molecular weight of 1,000 or more.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA 4010, EFKA 4046, EFKA 4080, EFKA 5010, EFKA 5207, EFKA 5244, EFKA 6745, EFKA 6750, EFKA 7414, EFKA 745, EFKA 7462, EFKA 7500, EFKA 7570, EFKA 7575, and EFKA 7580 (manufactured by EFKA Additives), DISPERSE AID 6, DISPERSE AID 8, DISPERSE AID 15, and DISPERSE AID 9100 (manufactured by San Nopco Ltd.); various types of SOLSPERSE dispersants such as SOLSPERSE 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by ADEKA Corporation), IONET S-20 (manufactured by Sanyo Chemical Industries, Ltd.), and DISPARLON KS-860, 873SN, and 874 (polymeric dispersant), #2150 (aliphatic polycarboxylic acid), and #7004 (polyether ester type) (manufactured by Kusumoto Chemicals, Ltd.).

The content of the dispersant in the ink composition is appropriately selected according to the intended purpose, and is preferably from 0.05 to 15% by mass with respect to the total mass of the ink composition.

<Other Components>

The ink composition used in the present invention may contain, as necessary, in addition to each component above, an ultraviolet absorber, an antioxidant, an antifading agent, conductive salts, solvents, polymeric compounds, basic compounds, and the like. As these other components, well-known ones may be used, and examples thereof include those described in JP2009-221416A.

Furthermore, the ink composition of the present invention preferably includes a polymerization inhibitor from the viewpoint of storability e and inhibition of head clogging.

The content of the polymerization inhibitor is preferably from 200 to 20,000 ppm with respect to the total mass of the ink composition of the present invention.

Examples of the polymerization inhibitor include nitroso-based polymerization inhibitors, hindered amine-based polymerization inhibitors, hydroquinone, benzoquinone, p-methoxyphenol, TEMPO, TEMPOL, and Cupferron Al.

<Ink Properties>

In the present invention, the ink composition has a viscosity at 25° C. of preferably no more than 40 mPa·s, more preferably 5 to 40 mPa·s, and even more preferably 7 to 30 mPa·s, taking into consideration a discharging property. Further, the viscosity of the ink composition at the discharge temperature (preferably 25 to 80° C., and more preferably 25 to 50° C.) is preferably 3 to 15 mPa·s, and more preferably 3 to 13 mPa·s. With regard to the ink composition of the present invention, it is preferable that its component ratio be appropriately adjusted such that the viscosity is in the above-described ranges. By setting the viscosity at room temperature (25° C.) to be high, even when a porous recording medium (support) is used, penetration of the ink composition into the recording medium can be avoided and the amount of uncured monomers can be reduced. In addition, ink bleeding when the liquid droplets of ink composition have landed can be suppressed, and as a result, the image quality is improved, which is thus preferable.

The surface tension at 25° C. of the ink composition of the present invention is preferably from 28 mN/m to 37.5 mN/m, more preferably from 31 mN/m to 37.5 mN/m, even more preferably from 32 mN/m to 37.0 mN/m, particularly preferably from 32.5 mN/m to 36.8 mN/m, and most preferably from 33.0 mN/m to 36.5 mN/m. Within the above ranges, a printed material having excellent glossiness is obtained.

Further, as a method for measuring the surface tension at 25° C. of the ink composition, a known method may be used, but a hanging ring suspension method or a Wilhelmy method is preferably used for the measurement. Preferable examples of the measurement method include a measurement method using an automatic surface tensiometer, CBVP-Z, manufactured by Kyowa Interface Science Co., Ltd., and a measurement method using SIGMA 702 manufactured by KSV Instruments Ltd.

2. Ink Jet Recording Method, Ink Jet Recording Device, and Printed Material

The ink jet recording method of the present invention is a method in which the ink composition of the present invention is discharged on a recording medium (a support, a recording material, or the like) for ink jet recording, and the ink composition discharged on the recording medium is irradiated with active energy rays to cure the ink composition, thereby forming an image.

More specifically, the ink jet recording method of the present invention preferably includes ($a^1$) a step of discharging the active energy ray-curable ink composition of the present invention onto a recording medium, and ($b^1$) a step of irradiating the discharged ink composition with active energy rays to cure the ink composition.

In the ink jet recording method of the present invention, an image is formed by the ink composition cured on the recording medium by including the ($a^1$) and ($b^1$) steps.

In addition, the ink jet recording method of the present invention is preferably carried out in a multi-pass mode, in which the ($a^1$) and ($b^1$) steps are carried out twice or more in the same portions on the recording medium, that is, printing is carried out by overstriking the same portions. In a case of carrying out the printing in a multi-pass mode by using the ink composition of the present invention, an image having excellent glossiness is obtained.

In addition, the printed material recorded by the ink jet recording method of the present invention is one of the preferable embodiments of the present invention.

In the ($a^1$) and (a) steps of the ink jet recording method of the present invention, the ink jet recording device which will be described in detail may be used.

<Ink Jet Recording Device>

The ink jet recording device that can be used in the ink jet recording method of the present invention is not particularly limited, and one which is arbitrarily selected from known ink jet recording devices capable of achieving a desired resolution can be used. That is, any known ink jet recording devices including commercially available products can be used to carry out the discharge of the ink composition onto the recording medium in the ($a^1$) and (a) steps of the ink jet recording method of the present invention.

Examples of the ink jet recording device that can be used in the present invention include devices including, for example, an ink supply system, a temperature sensor, and a source of active energy rays.

The ink supply includes, for example, a main tank containing the ink composition of the present invention, a supply pipe, an ink supply tank immediately before an ink jet head, a filter, and a piezo system ink jet head. The piezo system ink jet head may be driven so as to discharge multisize dots of preferably 1 to 100 pl, and more preferably 8 to 30 pl, at a resolution of preferably 320×320 dpi to 4,000×4,000 dpi, more preferably 400×400 dpi to 1,600×1,600 dpi, and even more preferably 720×720 dpi. In addition, dpi as mentioned in the present invention denotes the number of dots per 2.54 cm.

As described above, in the ink composition of the present invention, since it is preferable for the ink composition discharged to be at a constant temperature, the ink jet recording device is preferably equipped with a unit for stabilizing an ink composition temperature. The sections to be controlled at a constant temperature include a piping system ranging from an ink tank (an intermediate tank in a case where an intermediate tank is present) to a nozzle injection side, and all the members. That is, a section from the ink supply tank to the ink jet head is thermally insulated and heated.

A method of controlling temperature is not particularly limited, but it is preferable to provide, for example, a plurality of temperature sensors at pipe section positions, and control heating according to the ink flow rate of the ink composition and the temperature of the environment. The temperature sensors may be provided on the ink supply tank and in the vicinity of the ink jet head nozzle. Further, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heating unit.

The ink composition of the present invention is preferably discharged using the above mentioned ink jet recording device, after being heated to preferably 25 to 80° C., and more preferably 25 to 50° C., so as to reduce the viscosity of the ink composition to preferably 3 to 15 mPa·s, and more preferably 3 to 13 mPa·s. In particular, it is preferable to use the ink composition having an ink viscosity at 25° C. of 50 mPa·s or less since discharge can be satisfactorily carried out. By employing this method, high discharge stability can be realized.

The radioactive ray-curable ink composition such as the ink composition of the present invention generally has a viscosity that is higher than that of an aqueous ink composition used as an ordinary ink jet composition used for ink jet recording, and thus, viscosity variation due to a change in temperature at the time of discharge is large. Viscosity variation in the ink composition has a large effect on changes in liquid droplet size and changes in liquid droplet discharge speed, and as a result, causes the image quality to be degraded. It is therefore necessary to maintain the temperature of the ink composition during the discharge as constant as possible. In the present invention, the control range for the temperature is suitably ±5° C. of a set temperature, more preferably ±2° C. of the set temperature, and even more preferably ±1° C. of the set temperature.

Next, the $(b^1)$ and (b) steps will be described.

The ink composition discharged onto the recording medium is cured by the irradiation of active energy rays (active rays). This is due to an initiating species such as a radical, being generated by decomposition of the polymerization initiator included in the ink composition of the present invention by the irradiation of active energy rays, the initiating species functioning so as to make a polymerization reaction of a polymerizable compound take place and to promote it. At this time, if a sensitizer is present together with the polymerization initiator in the ink composition, the sensitizer in the system absorbs active energy rays, becomes excited, and promotes decomposition of the polymerization initiator by contact with the polymerization initiator, thus enabling a curing reaction with higher sensitivity to be achieved.

The active energy rays used in this process may include $\alpha$ rays, $\gamma$ rays, an electron beam, X rays, ultraviolet rays, visible light, and infrared rays. Although it depends on the absorption characteristics of the sensitizer, the peak wavelength of the active energy rays is, for example, from 200 to 600 nm, preferably from 300 to 450 nm, and more preferably from 320 to 420 nm, and ultraviolet rays having a peak wavelength of the active energy rays in the range of 340 to 400 nm are particularly preferred.

Furthermore, the polymerization initiation system of the ink composition of the present invention has sufficient sensitivity for low-output active energy rays. Therefore, curing is suitably carried out so that the illumination intensity on the exposed surface is preferably from 10 to 4,000 mW/cm$^2$, and more preferably from 20 to 2,500 mW/cm$^2$.

As a source of active energy rays, a mercury lamp, a gas/solid laser, or the like is mainly used, and as a light source used for curing an ultraviolet ray-curable ink composition for ink jet recording, a mercury lamp and a metal halide lamp are widely known. However, from the viewpoint of protection of the environment, there has recently been a strong desire for being free from mercury, and replacement by a GaN-based semiconductor ultraviolet light-emitting device is very useful from industrial and environmental viewpoints. Furthermore, LED (UV-LED) and LD (UV-LD) have small dimensions, long life, high efficiency, and low cost, and their use as a photocurable ink jet light source can be expected.

Furthermore, light-emitting diodes (LED) and laser diodes (LD) may be used as the source of active energy rays, and as the source of active energy rays of the present invention a light-emitting diode is preferable. In particular, when a source of ultraviolet rays is needed, an ultraviolet LED or an ultraviolet LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit active energy rays whose wavelength is centered between 300 nm and 370 nm. Furthermore, other ultraviolet LEDs are available, and active rays having a wavelength in a different ultraviolet ray bandwidth may be irradiated. The source of active energy rays particularly preferable in the present invention is a UV-LED, and a UV-LED having a peak wavelength at 340 to 400 nm is particularly preferable.

In addition, the maximum illumination intensity of the LED on a recording medium is preferably from 10 to 2,000 mW/cm$^2$, more preferably 20 to 1,000 mW/cm$^2$, and particularly preferably 50 to 800 mJ/cm$^2$.

The ink composition of the present invention is suitably irradiated with such active energy rays for preferably 0.01 to 120 seconds, and more preferably 0.1 to 90 seconds.

Irradiation conditions and a basic irradiation method for active energy rays are disclosed in JP1985-132767A (JP-S60-132767A). Specifically, a light source is provided on either side of a head unit that includes a discharge device for an ink composition, and the head unit and the light source are made to scan by a so-called shuttle system. Irradiation of active energy rays is carried out after a certain time (preferably 0.01 to 0.5 seconds, more preferably 0.01 to 0.3 seconds, and even more preferably 0.01 to 0.15 seconds) has elapsed from when the ink composition has landed. By controlling the time from landing of the ink composition to irradiation so as to be a minimum in this way, it becomes possible to prevent the ink composition that has landed on a recording medium from bleeding before being cured. Furthermore, since the ink composition can be exposed before it reaches a deep area of a porous recording medium that the light source cannot reach, it is possible to prevent monomers from remaining unreacted, which is therefore preferable.

In addition, curing may be completed using another light source that is not driven. Further, examples of the irradiation method include a method employing an optical fiber and a method in which a collimated light (UV light) is irradiated on a mirror surface provided on a head unit side face, and a recorded area is irradiated with the reflected light. Such a curing method may also be applied to the ink jet recording method of the present invention.

By employing the ink jet recording method as described above, it is possible to maintain a uniform dot diameter for the landed ink composition even for various types of recording media having different surface wettability, thereby improving the image quality. Further, in order to obtain a color image, it is preferable to superimpose colors in order from those with a low lightness. By superimposing ink compositions in order from one with low lightness, it is easy for irradiated rays to reach a lower ink composition, and good curing sensitivity, a decreased amount of residual monomers, and an improvement in adhesion may be expected. In addition, as for the irradiation, although it is possible to discharge all colors and then expose them at the same time, it is preferable to expose one color at a time from the viewpoint of promoting curing.

In this way, the ink composition of the present invention is cured by the irradiation of active energy rays with high sensitivity to thus form an image on the surface of the recording medium.

It is preferable to use the ink composition of the present invention as an ink set including plural inks for ink jet recording.

In the ink jet recording method of the present invention, the order in which colored ink compositions are discharged is not particularly limited, but it is preferable to apply to a recording medium from a colored ink composition having a high lightness; when the ink compositions of yellow, cyan, magenta, and black are used, they are preferably applied on the recording medium in the order of yellow, cyan, magenta, black. Further, when the ink composition of white is additionally used, they are preferably applied on the recording medium in the order of white, yellow, cyan, magenta, black. In addition, the present invention is not limited thereto, and an ink set of the present invention including at least a total of seven colors, that is, the ink compositions of yellow, light cyan, light magenta, cyan, magenta, black, and white may preferably be used, and in this case, they are preferably applied on the recording medium in the order of white, light cyan, light magenta, yellow, cyan, magenta, black.

In the present invention, the recording medium is not particularly limited, but as a support or recording material, known recording media may be used. Examples of the recording medium include paper, paper laminated with a plastic (for example, polyethylene, polypropylene, and polystyrene), metal sheets (for example, aluminum, zinc, and copper), plastic films (for example, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal), and paper or plastic films on which the above-mentioned metal is laminated or vapor-deposited, and resin sheets. Further, as the recording medium in the present invention, a non-absorbing recording medium may be suitably used.

Furthermore, the ink composition of the present invention is very suitable for the production of a decorative sheet, and in this case, an ink jet recording method including the following steps in this order is preferable:

(step a) a step of discharging the ink composition of the present invention on a substrate, and (step b) a step of irradiating the discharged ink composition with active rays to produce a decorative sheet.

The decorative sheet of the present invention is preferably a decorative sheet in which a cured image layer of the active energy ray-curable ink composition of the present invention is provided on a resin sheet.

Furthermore, it is also preferable that the decorative sheet is subjected to a step of vacuum molding, pressure molding, or vacuum pressure molding to produce a decorative sheet molded product.

Moreover, it is also preferable to carry out punching processing in the decorative sheet molded product.

In particular, since an image layer obtained with the ink composition of the present invention is excellent in stretchability and heat resistance, even in a case of carrying out vacuum molding, pressure molding, or vacuum pressure molding, missing image, cracks of the image, or the like are prevented. Further, cracks of the image generated during the punching processing are also inhibited.

<Vacuum Molding Processing, Pressure Molding Processing, and Vacuum/Pressure Molding Processing>

The vacuum molding processing is a method in which a support having an image formed thereon is preheated to a temperature at which it can be thermally deformed, and molding is carried out by pressing it against a mold and cooling while sucking it toward the mold by means of pressure reduction and stretching it. For the vacuum molding processing, a combination of a convex mold and a concave mold is preferably used.

The pressure molding processing is a method in which a support having an image formed thereon is preheated to a temperature at which it can be thermally deformed, and molding is carried out by pressing it against a mold by applying pressure from the side opposite to the mold and cooling.

The vacuum/pressure molding processing is a method in which molding is carried out by applying a vacuum and pressure at the same time.

In detail, the "Thermal Molding" section described on p. 766 to 768 of Polymer Dictionary (Maruzen) and the publications cited in the section may be referred to.

The processing temperature is appropriately selected depending on the type of a support, and the support, and it is preferable to carry out molding when the support temperature is 60° C. to 180° C., more preferably 80° C. to 160° C., and even more preferably 80° C. to 150° C. In the above-described ranges, it is possible to carry out processing in which there is little change in the color of the image and release from a mold is excellent.

The ink composition of the present invention is particularly suitable for in-mold molding.

In the present invention, the method for producing an in-mold molded product includes (step 1) a step of disposing the decorative sheet of the present invention or the decorative sheet molded product of the present invention on the inner wall of a hollow portion formed by plural molds, and (step 2) a step of injecting a molten resin from a gate into the hollow portion.

As the step (1), a step of disposing the decorative sheet of the present invention in a molding mold and inserting it is exemplified. Specifically, the decorative sheet is fed into the molding mold including plural dies of a movable die and a fixed die, preferably with the image layer turned to the inside.

At this time, the single transfer decorative sheets may be fed one by one, or the required parts of a long decorative sheet may intermittently be fed.

When the decorative sheet is disposed in the molding mold, the decorative sheet may be disposed while (i) the mold is simply heated, and the mold is allowed to be adhered by sucking vacuum, or (ii) pre-molding is carried by heating and softening using a heating plate from the side of the image layer to make the decorative sheet follow the shape of the inside of the mold, thereby performing mold clamping by adhering the decorative sheet to the inner surface of the mold. The heating temperature in (ii) is around the glass transition temperature of the substrate film or higher, and preferably in the range lower than the melting temperature (or melting point), and the heating is usually carried out at a temperature that is around the glass transition temperature. Further, the temperature that is around the glass transition temperature means a range of the glass transition temperature ± about 5° C., and generally about from 70 to 130° C. Further, in a case of (ii), for the purpose of adhering the decorative sheet to the surface of the molding mold, vacuum suction may be carried out when the decorative sheet is heated and softened by a heat plate.

Further, in the present invention, the decorative sheet molded product that has been molded in advance may be disposed in a mold.

The step (2) is an injection step of injecting a molten resin into a cavity (hollow portion), and cooling and solidifying the resin to laminate and integrate the resin molded product and the decorative sheet. In a case where the injection resin is a thermoplastic resin, it is made into a flowable state by heating and melting, and in a case where the injection resin is a thermosetting resin, an uncured liquid composition is appropriately heated to be injected in a flowable state, and cooled and solidified. Thus, the decorative sheet is integrated and adhered with the formed resin molded product to provide a decorative molded article (decorated in-mold molded product). The heating temperature of the injection resin depends on the injection resin, but is preferably from about 180 to 280° C.

The injection resin used in a decorative molded article may be any one of a thermoplastic resin capable of injection molding or a thermosetting resin (including a two-liquid curable resin), and various resins may be used. Examples of such a thermoplastic resin material include a polystyrene-based resin, a polyolefin-based resin, an acrylonitrile-butadiene-styrene resin (ABS resin) (including a heat-resistant ABS resin), an acrylonitrile-styrene resin (AS resin), an acrylonitrile resin (AN resin), a polyphenylene oxide-based resin, a polycarbonate-based resin, a polyacetal-based resin, an acrylic resin, a polyethylene terephthalate-based resin, a polybutylene terephthalate-based resin, a polysulfone-based resin, and a polyphenylene sulfide-based resin. Further, examples of the thermosetting resin include a two-liquid reaction curable polyurethane-based resin and an epoxy-based resin. These resins may be used singly or as a mixture of two or more kinds thereof.

Further, in addition to the above-described step, a step of withdrawing the molded product integrated with the decorative sheet of the resin molded product from the mold is preferably further included.

EXAMPLES

Hereinafter, the present invention will be described in more detail with respect to Examples, but the present invention is not limited by the embodiments in these Examples. Further, "part(s)" and "%" are based on mass unless otherwise noted.

The compounds used in the present Examples will be described below.

<Pigments>

IRGALITE BLUE GLVO (cyan pigment, C. I. Pigment Blue 15:4, manufactured by BASF Japan Ltd.)

CINQUASIA MAGENTA RT-355 D (magenta pigment, a mixture of C. I. Pigment Violet 19 and C. I. Pigment Red 202, manufactured by BASF Japan Inc.)

NOVOPERM YELLOW H2G (yellow pigment, C. I. Pigment Yellow 120, manufactured by Clariant K. K.)

SPECIAL BLACK 250 (black pigment, C. I. Pigment Black 7, manufactured by BASF Japan Inc.)

TIPAQUE CR60-2 (white pigment, manufactured by Ishihara Sangyo Kaisha, Ltd.)

<Dispersants>

SOLSPERSE 36000 (pigment dispersant, manufactured by Lubrizol Japan Ltd.)

SOLSPERSE 32000 (pigment dispersant, manufactured by Lubrizol Japan Ltd.)

SOLSPERSE 22000 (pigment dispersant, manufactured by Lubrizol Japan Ltd.)

SOLSPERSE 5000 (pigment dispersant, manufactured by Lubrizol Japan Ltd.)

<Monomers/Oligomers>

—N-Vinyl Compound—

NVC (N-vinyl caprolactam, manufactured by BASF Japan Ltd.)

—Compound Represented by Formula (I)—

A-1 (cyclohexyl acrylate, manufactured by Osaka Organic Chemical Industry Ltd.)

A-2 (4-t-butylcyclohexyl acrylate, manufactured by BASF Japan Ltd., trade name LAROMER TBCH)

A-3 (3,3,5-trimethylcyclohexyl acrylate, manufactured by Sartomer Japan Co., Inc.)

A-4 (isobornyl acrylate, SR506D, manufactured by Sartomer Japan Co., Inc.)

A-5 (dicyclopentanyl acrylate, FA-513 A, manufactured by Hitachi Chemical Co., Ltd.)

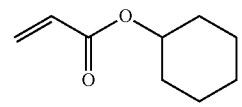

A-1

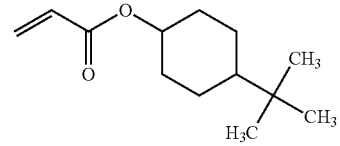

A-2

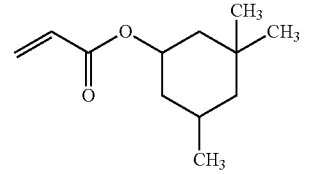

A-3

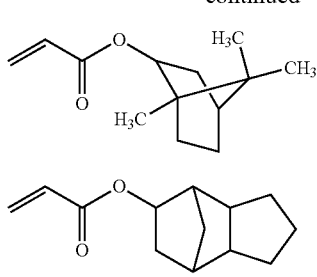

A-4

A-5

—Other Monofunctional Radically Polymerizable Monomers—
PEA (phenoxyethyl acrylate, SR339, manufactured by Sartomer Japan Co., Inc.)
EOEOEA (2-(2-ethoxyethoxy)ethyl acrylate, SR256C, manufactured by Sartomer Japan Co., Inc.)
—Oligomers—
[Urethane Oligomers]
O-1: U-200 PA (urethane oligomer having a partial structure represented by the formula (b-2), manufactured by Shin-Nakamura Chemical Co., Ltd., acrylate value of 1,300 g/value, Mw of 2,600, glass transition temperature (Tg): 20° C. or lower)
O-2: CN9007 (urethane oligomer having a partial structure represented by the formula (b-2), manufactured by Sartomer Japan Co., Inc., acrylate value of 2,250 g/value, Mw of 4,000, Tg: 1° C.)
O-3: UV3200B (urethane oligomer having no partial structure represented by the formula (b-1), manufactured by The Nippon Synthetic Chemical Industry Co, Ltd, acrylate value of 5,000 g/value, Mw of 10,000, Tg: −8° C.)
O-4: UV7510B (urethane oligomer having no partial structure represented by the formula (b-1), manufactured by The Nippon Synthetic Chemical Industry Co., Ltd., acrylate value of 1,160 g/value, Mw of 3,500, Tg: 17° C.)
[Polyester Oligomers]
O-5: EBECRYL 884 (manufactured by Daicel-Cytec Company Ltd., acrylate value of 1,500 g/value, Mw of 3,000, Tg: 20° C. or lower)
[Polyepoxy Oligomers]
O-6: EBECRYL 3708 (manufactured by Daicel-Cytec Company Ltd., acrylate value of 750 g/value, Mw of 1,500, Tg: 20° C. or lower)
O-7: A600 (manufactured by Shin-Nakamura Chemical Co., Ltd., acrylate value of 354 g/value, Mw of 708, Tg: −23° C. or lower)
—Bifunctional Monomers—
C-1: VEEA (the following compound, viscosity (25° C.): 3.65 mPa·s, manufactured by Nippon Shokubai Co., Ltd.)
C-2: SR238 (1,6-hexanediol diacrylate, viscosity (25° C.): 5 to 9 mPa·s, manufactured by Sartomer Japan Co., Inc.)
C-3: SR508 (dipropylene glycol diacrylate, viscosity (25° C.): 11 mPa·s, manufactured by Sartomer Japan Co., Inc.)
C-4: SR9003 (PO-modified neopentyl glycol diacrylate, viscosity (25° C.): 15 mPa·s, manufactured by Sartomer Japan Co., Inc.)
<Polymerization Initiators>
DAROCUR TPO (2,4,6-trimethylbenzoyldiphenylphosphine oxide, manufactured by BASF Japan Ltd.)
Irg 819 (IRGACURE 819, bis(2,4,6-trimethylbenzoyl)phenylphosphine oxide, manufactured by BASF Japan Ltd.)
ITX (photopolymerization initiator, isopropylthioxanthone, manufactured by Shell Chemicals Japan Ltd.)
<Other Additives>
Silicone Polymers 1, 4, 7, 10, 13, and 16: each corresponding to the polymers 1, 4, 7, 10, 13, and 16 described in Table 1.
UV 12 (polymerization inhibitor, manufactured by Kromachem, aluminum salt)
MEHQ (polymerization inhibitor, manufactured by Tokyo Chemical Industry Co., Ltd., hydroquinone monomethyl ether)
EBECRYL 8405 (manufactured by Daicel-Cytec Company Ltd., acrylate value of 675 g/value, Mw of 2,700, Tg: 30° C.)
CD560 (alkoxylated hexanediol diacrylate, viscosity (25° C.): 24 mPa·s, manufactured by Sartomer Japan Co., Inc.)
<Preparation of Cyan Mill Base C>
C Pigment (cyan pigment, IRGALITE BLUE GLVO, manufactured by BASF Japan Ltd.): 30 parts by mass
PEA: 50 parts by mass
SOLSPERSE 32000: 10 parts by mass
SOLSPERSE 5000: 10 parts by mass
The respective components above were stirred to obtain a cyan mill base C. Further, the stirring was carried out by placing the respective components in a disperser motor mill M50 (manufactured by EIGER Japan K. K.), and dispersing them at a peripheral speed of 9 m/s for 8 hours, using zirconia beads having a diameter of 0.65 mm.
<Preparation of Magenta Mill Base M>
M Pigment (magenta pigment, CINQUASIA MAGENTA RT-355 D (manufactured by BASF Japan Inc.): 30 parts by mass
PEA: 50 parts by mass
SOLSPERSE 32000: 20 parts by mass
The respective components above were stirred to obtain a magenta mill base M. Further, the stirring was carried out by placing the respective components in a disperser motor mill M50 (manufactured by EIGER Japan K. K.), and dispersing them at a peripheral speed of 9 m/s for 8 hours, using zirconia beads having a diameter of 0.65 mm.
<Preparation of Yellow Mill Base Y>
Y Pigment (yellow pigment, NOVOPERM YELLOW H2G (manufactured by Clariant K. K.): 30 parts by mass
PEA: 50 parts by mass
SOLSPERSE 22000: 20 parts by mass
The respective components above were stirred to obtain a yellow mill base Y. Further, the stirring was carried out by placing the respective components in a disperser motor mill M50 (manufactured by EIGER Japan K. K.), and dispersing them at a peripheral speed of 9 m/s for 8 hours, using zirconia beads having a diameter of 0.65 mm.
<Preparation of Black Mill Base K>
K Pigment (black pigment, SPECIAL BLACK 250 (manufactured by BASF Japan Inc.): 30 parts by mass
PEA: 50 parts by mass
SOLSPERSE 32000: 20 parts by mass
The respective components above were stirred to obtain a black mill base K. Further, the stirring was carried out by placing the respective components in a disperser motor mill M50 (manufactured by EIGER Japan K. K.), and dispersing them at a peripheral speed of 9 m/s for 8 hours, using zirconia beads having a diameter of 0.65 mm.

Examples 1 to 45 and Comparative Examples 1 to 9

<Preparation of Ink Composition>

The component A, the component B, the component C, a mill base (pigment dispersion), a polymerization initiator, and other additives were mixed with the formulations described in Tables 3 to 6, and stirred at a high speed, to obtain the ink compositions of Examples 1 to 45 and Comparative Examples 1 to 9.

<Ink Jet Image Recording>

Recording was performed on the recording medium using an ink jet recording device having a piezo-type ink jet nozzle. The ink supply system was constituted with a source tank, a supply pipe, an ink supply tank put in just before the ink jet head (hereinafter also referred to as a "head"), a filter, and a piezo-type ink jet head, and insulation and heating were performed from the ink supply tank up to the ink jet head portion. Temperature sensors were respectively provided in the vicinity of the ink supply tank and the ink jet head nozzle and temperature control was performed such that the nozzle portion was always at 40° C.±2° C. The piezo-type ink jet head was driven so as to be able to inject 1 to 10 pl multi-size dots at a resolution of 4,800×4,800 dpi. The exposure system, the main scanning speed, and the injection frequency were adjusted so that irradiation began 0.1 seconds after the ink composition landed on the recording medium, and UV light was condensed and irradiated so that an exposure area illumination intensity become 1,200 mW/cm$^2$. Further, the exposure energy provided by the irradiation was adjusted with the exposure time varying. As the ultraviolet lamp, a HAN250NL High-Cure mercury lamp (manufactured by GS Yuasa Corporation) was used. Further, the dpi as mentioned in the present invention represents the number of dots per 2.54 cm. As the recording medium, a polyvinyl chloride substrate (film thickness of 200 μm, manufactured by SAKURAI Co., Ltd., trade name: LLBAU, TARPORIN substrate made of polyvinyl chloride) was used.

Here, since the image is formed by the head reciprocating five times, the ink dropped first is irradiated with an exposure amount equivalent to 5 reciprocations. Since the exposure amount of one reciprocation is about 300 mJ/cm$^2$, the total exposure amount in a case of 5 reciprocations is 1,500 mJ/cm$^2$. In the evaluation of curability below, the evaluation was carried out by controlling the number of reciprocations.

—Evaluation Method—

<Evaluation of Ink Flow Resistance (Injection Molding Suitability)>

According to the ink jet recording method, the ink printing of a solid image having an average film thickness of 30 μm was carried out on a transparent substrate (polycarbonate) as a resin sheet, using the ink compositions of Examples and Comparative Examples, thereby producing a decorative sheet having an ink film (image layer).

Using the following injection molding machine, the decorative sheet was fixed to the inner wall of the hollow portion of a 5.5 cm×5.5 cm mold such that the image layer was provided on the inner side, and then an ABS (acrylonitrile/butadiene/styrene) at 220° C. was injected toward the surface of the image layer of the decorative sheet. For the molded article, the ink flow resistance generated at the moment was evaluated.

The ink flow refers to a phenomenon in which the ink image of the decorative sheet does not follow the expansion and contraction of the injected resin that has been hot-molten and the ink image is lost, and the length of the lost portion was measured.

Injection Molding Machine Used: SG-50, manufactured by Sumitomo Heavy Industries, Ltd.

The evaluation criteria of the ink flow resistance were as follows.

5: Ink flow did not occur at all.
4: The image intensity of the image layer decreased at the injection place.
3: Ink flow having a length of less than 0.5 cm occurred in the image layer at the injected place.
2: Ink flow having a length of from 0.5 cm to less than 0.5 cm occurred in the image layer at the injected place.
1: Ink flow having a length of 5 cm or more occurred in the image layer at the injected place.

The evaluation 5 is the most excellent, and the evaluations 3 or more are in a range in which there are no problems with practical use.

<Measurement of Heat Stretching rate (Evaluation of Heat Stretchability)>

According to the ink jet recording method, the ink printing of a solid image having an average film thickness of 30 μm was carried out on a transparent substrate (polycarbonate) as a resin sheet, using the ink compositions of Examples and Comparative Examples. The ink image was cut to 5 cm×2 cm to produce a sample image. Using a stretching machine, the sample image was stretched under the following temperature conditions and tensile rate conditions, and the stretching rate was measured.

Stretching Machine Used: Tensilon, manufactured by Shimadzu Corporation.

Conditions: Temperature of 180° C., tensile rate 50 millimeters/min.

The stretching rate is calculated by measuring the length at the time of breaking and using the following equation:

$$\{(\text{length at time of breaking}-\text{length before stretching})/\text{length before stretching}\}\times 100.$$

For example, in a case of breaking at 10 cm, the stretching rate is calculated as {(10 cm−5 cm)/5 cm}×100=100%.

The evaluation criteria of the heating stretching were as follows.

5: Stretching rate of 200% or more
4: Stretching rate of 150% or more to less than 200%
3: Stretching rate of 100% or more to less than 150%
2: Stretching rate of 70% or more to less than 100%
1: Stretching rate of less than 70%

The evaluation 5 is the most excellent, and the evaluations 3 or more are in a range in which there are no problems with practical use.

<Evaluation of Punching Suitability (Crack Inhibiting Properties)>

According to the ink jet recording method, the ink printing of a solid image having an average film thickness of 30 μm was carried out on a transparent substrate (polycarbonate) as a resin sheet, using the ink compositions of Examples and Comparative Examples, thereby producing an ink image. The punching test was carried out using an office punching machine under the following conditions, and the punching suitability was evaluated visually and by using an optical microscope.

Machine used: Office punching machine (product name: DP-23 Blue, manufactured by MAX Co., Ltd.)

Conditions: Temperature of 25° C.

The evaluation criteria of punching suitability were as follows:

5: No places having cracks were observed visually or through a microscope.
4: Two or less places having cracks were observed through a microscope, but not observed visually.
3: Three or more places having cracks were observed through a microscope, but not observed visually.
2: Cracks that can be visually observed were generated at the vicinity of the punched hole.
1: Cracks spreading 5 cm or more were generated from the vicinity of the punched hole.

The evaluation 5 is the most excellent and the evaluations of 3 or more are in a range in which there are no problems with practical use.

<Evaluation of Adhesiveness>

According to the ink jet recording method, the ink printing of a solid image having an average film thickness of 30 μm was carried out on an evaluation substrate using the ink compositions of Examples and Comparative Examples, thereby producing an ink image. The ink image was cut to 5 cm×2 cm, and evaluated in accordance with JIS K5600-5-6: adhesiveness of a coated film (cross-cut method). As the evaluation substrate, an untreated polyethylene terephthalate (PET) (LUMIRROR T60, manufactured by Toray Industries, Inc.), an acryl resin (ACRYLITE, manufactured by Mitsubishi Rayon Co., Ltd.), and a polycarbonate (PANLITE, manufactured by Teijin Chemicals Ltd.) were used.

The evaluation criteria are shown below.
5: All of the three types of the substrates were evaluated as 0 in accordance with JIS K5600-5-6.
4: All of the three types of the substrates were evaluated as 1 or less in accordance with JIS K5600-5-6.
3: All of the three types of the substrates were evaluated as 2 or less in accordance with JIS K5600-5-6.
2: Among the three types of the substrates, one type was evaluated as 3 or more in accordance with JIS K5600-5-6.
1: All of the three types of the substrates were evaluated as 3 or more in accordance with JIS K5600-5-6.

Furthermore, the evaluations of 3 or more are in an acceptable range in which there are no problems with practical use.

TABLE 3

| Example | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| NVC | 10 | 20 | 24 | 30 | 50 | 24 | 24 | 24 | 24 | 24 | 24 | 24 | 24 | 24 | 24 | 24 |
| A-4 | 25 | 25 | 25 | 25 | 21 | 47 | 30 | 15 | 10 | 15 | 15 | 15 | 15 | 15 | 15 | 15 |
| O-1 | 5 | 5 | 5 | 5 | 5 | 5 | 5 | 5 | 5 | 0.1 | 1 | 8 | 10 | 5 | 5 | 5 |
| C-1 | 2 | 2 | 2 | 2 | 2 | 2 | 2 | 2 | 2 | 2 | 2 | 2 | 2 | 0.1 | 1 | 5 |
| EOEOEA | 5 | 5 | 5 | 5 | 5 | 5 | 5 | 5 | 5 | 5 | 5 | 5 | 5 | 5 | 5 | 5 |
| PEA | 36 | 26 | 22 | 16 | — | — | 17 | 32 | 37 | 37 | 36 | 29 | 27 | 34 | 33 | 29 |
| Cyan mill base C | 9 | 9 | 9 | 9 | 9 | 9 | 9 | 9 | 9 | 9 | 9 | 9 | 9 | 9 | 9 | 9 |
| Irg 819 | 5 | 5 | 5 | 5 | 5 | 5 | 5 | 5 | 5 | 5 | 5 | 5 | 5 | 5 | 5 | 5 |
| ITX | 1 | 1 | 1 | 1 | 1 | 1 | 1 | 1 | 1 | 1 | 1 | 1 | 1 | 1 | 1 | 1 |
| UV 12 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| MEHQ | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Silicone Polymer 1 | 1 | 1 | 1 | 1 | 1 | 1 | 1 | 1 | 1 | 1 | 1 | 1 | 1 | 1 | 1 | 1 |
| Total (parts by mass) | 100 | 100 | 100 | 100 | 100 | 100 | 100 | 100 | 100 | 100 | 100 | 100 | 100 | 100 | 100 | 100 |
| Ink flow resistance | 4 | 4 | 5 | 5 | 4 | 4 | 4 | 4 | 5 | 5 | 3 | 4 | 5 | 5 | 3 | 4 | 5 |
| Heat stretchability | 5 | 5 | 5 | 5 | 5 | 5 | 5 | 5 | 4 | 5 | 5 | 4 | 3 | 5 | 5 | 4 |
| Punching suitability | 4 | 4 | 5 | 4 | 4 | 5 | 4 | 5 | 4 | 3 | 4 | 5 | 5 | 3 | 4 | 5 |
| Adhesiveness | 3 | 4 | 5 | 5 | 5 | 4 | 4 | 5 | 5 | 5 | 5 | 5 | 3 | 3 | 4 | 5 |

TABLE 4

| Example | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| NVC | 24 | 24 | 24 | 24 | 24 | 24 | 24 | 24 | 24 | 24 | 24 | 24 | 24 | 24 | 24 | 24 |
| A-4 | 15 | 15 | 15 | 15 | 15 | 15 | 15 | 15 | 30 | — | — | — | 15 | 15 | 15 | 15 |
| A-1 | — | — | — | — | — | — | — | — | — | 15 | — | — | — | — | — | — |
| A-3 | — | — | — | — | — | — | — | — | — | — | 15 | — | — | — | — | — |
| A-5 | — | — | — | — | — | — | — | — | — | — | — | 15 | — | — | — | — |
| O-1 | 5 | 5 | 5 | 5 | 5 | 5 | 5 | 5 | 1 | 5 | 5 | 5 | — | — | — | — |
| O-2 | — | — | — | — | — | — | — | — | — | — | — | — | 5 | — | — | — |
| O-3 | — | — | — | — | — | — | — | — | — | — | — | — | — | 5 | — | — |
| O-4 | — | — | — | — | — | — | — | — | — | — | — | — | — | — | 5 | — |
| O-5 | — | — | — | — | — | — | — | — | — | — | — | — | — | — | — | 5 |
| C-1 | 10 | — | 2 | 2 | 2 | 2 | 2 | 2 | 2 | 2 | 2 | 2 | 2 | 2 | 2 | 2 |
| C-2 | — | 2 | — | — | — | — | — | — | — | — | — | — | — | — | — | — |
| EOEOEA | 5 | 5 | 5 | — | 2 | 10 | 20 | 5 | 5 | 10 | 10 | 10 | 10 | 10 | 10 | 10 |
| PEA | 24 | 32 | 33 | 37 | 35 | 27 | 17 | 33 | 21 | 27 | 27 | 27 | 27 | 27 | 27 | 27 |
| Cyan mill base C | 9 | 9 | 9 | 9 | 9 | 9 | 9 | 9 | 9 | 9 | 9 | 9 | 9 | 9 | 9 | 9 |
| Irg 819 | 5 | 5 | 5 | 5 | 5 | 5 | 5 | 5 | 5 | 5 | 5 | 5 | 5 | 5 | 5 | 5 |
| ITX | 1 | 1 | — | 1 | 1 | 1 | 1 | 1 | 1 | 1 | 1 | 1 | 1 | 1 | 1 | 1 |
| UV 12 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| MEHQ | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

TABLE 4-continued

| Example | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| Silicone Polymer 1 | 1 | 1 | 1 | 1 | 1 | 1 | 1 | — | 1 | 1 | 1 | 1 | 1 | 1 | 1 | 1 |
| Total (parts by mass) | 100 | 100 | 100 | 100 | 100 | 100 | 100 | 100 | 100 | 100 | 100 | 100 | 100 | 100 | 100 | 100 |
| Ink flow resistance | 5 | 5 | 5 | 5 | 5 | 5 | 3 | 5 | 4 | 4 | 5 | 5 | 5 | 5 | 5 | 5 |
| Heat stretchability | 3 | 5 | 5 | 5 | 3 | 5 | 5 | 5 | 5 | 5 | 5 | 5 | 5 | 5 | 4 | 4 |
| Punching suitability | 5 | 5 | 5 | 4 | 5 | 5 | 5 | 5 | 4 | 5 | 5 | 4 | 5 | 5 | 4 | 5 |
| Adhesiveness | 5 | 4 | 4 | 5 | 5 | 5 | 5 | 4 | 5 | 5 | 5 | 5 | 5 | 5 | 5 | 4 |

TABLE 5

| Example | 33 | 34 | 35 | 36 | 37 | 38 | 39 | 40 | 41 | 42 | 43 | 44 | 45 |
|---|---|---|---|---|---|---|---|---|---|---|---|---|---|
| NVC | 24 | 24 | 24 | 24 | 24 | 24 | 24 | 24 | 24 | 24 | 24 | 24 | 24 |
| A-4 | 15 | 15 | 15 | 15 | 15 | 15 | 15 | 15 | 15 | 15 | 15 | 15 | 15 |
| O-1 | — | — | 5 | 5 | 5 | 5 | 5 | 5 | 5 | 5 | 5 | 5 | 5 |
| O-6 | 5 | — | — | — | — | — | — | — | — | — | — | — | — |
| O-7 | — | 5 | — | — | — | — | — | — | — | — | — | — | — |
| C-1 | 2 | 2 | — | — | — | 2 | 2 | 2 | 2 | 2 | 2 | 2 | 2 |
| C-2 | — | — | 2 | — | — | — | — | — | — | — | — | — | — |
| C-3 | — | — | — | 2 | — | — | — | — | — | — | — | — | — |
| C-4 | — | — | — | — | 2 | — | — | — | — | — | — | — | — |
| EOEOEA | 10 | 10 | 10 | 10 | 10 | 10 | 10 | 10 | 5 | 5 | 5 | 5 | 5 |
| PEA | 27 | 27 | 27 | 27 | 27 | 21 | 27 | 27 | 32 | 32 | 32 | 32 | 32 |
| Cyan mill base C | 9 | 9 | 9 | 9 | 9 | — | — | — | 9 | 9 | 9 | 9 | 9 |
| Magenta mill base M | — | — | — | — | — | 15 | — | — | — | — | — | — | — |
| Yellow mill base Y | — | — | — | — | — | — | 9 | — | — | — | — | — | — |
| Black mill base K | — | — | — | — | — | — | — | 9 | — | — | — | — | — |
| Irg 819 | 5 | 5 | 5 | 5 | 5 | 5 | 5 | 5 | 5 | 5 | 5 | 5 | 5 |
| ITX | 1 | 1 | 1 | 1 | 1 | 1 | 1 | 1 | 1 | 1 | 1 | 1 | 1 |
| UV 12 | 0.5 | 0.5 | 0.5 | 0.5 | 0.5 | 0.5 | 0.5 | 0.5 | 0.5 | 0.5 | 0.5 | 0.5 | 0.5 |
| MEHQ | 0.5 | 0.5 | 0.5 | 0.5 | 0.5 | 0.5 | 0.5 | 0.5 | 0.5 | 0.5 | 0.5 | 0.5 | 0.5 |
| Silicone Polymer 1 | 1 | 1 | 1 | 1 | 1 | 1 | 1 | 1 | — | — | — | — | — |
| Silicone Polymer 4 | — | — | — | — | — | — | — | — | 1 | — | — | — | — |
| Silicone Polymer 7 | — | — | — | — | — | — | — | — | — | 1 | — | — | — |
| Silicone Polymer 10 | — | — | — | — | — | — | — | — | — | — | 1 | — | — |
| Silicone Polymer 13 | — | — | — | — | — | — | — | — | — | — | — | 1 | — |
| Silicone Polymer 16 | — | — | — | — | — | — | — | — | — | — | — | — | 1 |
| Total (parts by mass) | 100 | 100 | 100 | 100 | 100 | 100 | 100 | 100 | 100 | 100 | 100 | 100 | 100 |
| Ink flow resistance | 5 | 5 | 5 | 5 | 5 | 5 | 5 | 5 | 5 | 5 | 5 | 5 | 5 |
| Heat stretchability | 4 | 3 | 4 | 4 | 4 | 5 | 5 | 5 | 5 | 5 | 5 | 5 | 5 |
| Punching suitability | 5 | 5 | 5 | 5 | 5 | 5 | 5 | 5 | 5 | 5 | 5 | 5 | 5 |
| Adhesiveness | 4 | 4 | 5 | 5 | 4 | 5 | 5 | 5 | 5 | 5 | 5 | 5 | 5 |

TABLE 6

| Example | 1 | 2 | 3 | 4 | 5 | 6 | 7 | 8 | 9 |
|---|---|---|---|---|---|---|---|---|---|
| NVC | 6 | 55 | 25 | 18 | 25 | 25 | 25 | 25 | 25 |
| IBOA | 5 | 5 | 5 | 60 | 5 | 22 | 22 | 5 | 5 |
| PEA | 66 | 17 | 48 | — | 53 | 24 | 22 | 51 | 51 |
| O-1 | 5 | 5 | 5 | 5 | — | 12 | 2 | — | 1 |
| EBECRYL 8405 | — | — | — | — | — | — | — | 1 | — |
| VEEA | 1 | 1 | — | — | — | — | 12 | 1 | — |
| CD 560 | — | — | — | — | — | — | — | — | 1 |
| Cyan mill base C | 9 | 9 | 9 | 9 | 9 | 9 | 9 | 9 | 9 |
| Irg 819 | 5 | 5 | 5 | 5 | 5 | 5 | 5 | 5 | 5 |
| ITX | 1 | 1 | 1 | 1 | 1 | 1 | 1 | 1 | 1 |
| UV 12 | 0.5 | 0.5 | 0.5 | 0.5 | 0.5 | 0.5 | 0.5 | 0.5 | 0.5 |
| MEHQ | 0.5 | 0.5 | 0.5 | 0.5 | 0.5 | 0.5 | 0.5 | 0.5 | 0.5 |
| Silicone Polymer 1 | 1 | 1 | 1 | 1 | 1 | 1 | 1 | 1 | 1 |
| Total (parts by mass) | 100 | 100 | 100 | 100 | 100 | 100 | 100 | 100 | 100 |
| Ink flow resistance | 2 | 1 | 2 | 1 | 1 | 5 | 5 | 4 | 1 |
| Heat stretchability | 2 | 1 | 1 | 5 | 5 | 1 | 1 | 1 | 2 |
| Punching suitability | 4 | 1 | 4 | 1 | 1 | 3 | 5 | 1 | 1 |
| Adhesiveness | 2 | 1 | 1 | 1 | 3 | 1 | 1 | 1 | 1 |

Furthermore, the numerical values in Tables 3 to 6 denote parts by mass.

This application claims priority under 35 U.S.C. §119 of Japanese Patent application JP 2012-095551, filed on Apr. 19, 2012 and Japanese Patent application JP 2013-054008, filed on Mar. 15, 2013, the entire contents of which are hereby incorporated by reference.

What is claimed is:

1. An active energy ray-curable ink composition comprising:
   (component A) monofunctional radically polymerizable monomers,
   (component B) a polyfunctional oligomer having a glass transition temperature of 20° C. or lower and an acrylate value of 300 g/value or more, and
   (component C) a bifunctional radically polymerizable monomer having a viscosity at 25° C. of 15 mPa·s or less,
   wherein the component A includes an N-vinyl compound and a compound represented by the following formula (I),
   the content of the N-vinyl compound with respect to the total amount of the ink composition is from 10 to 50% by mass, and
   the content of the component A with respect to the total amount of the ink composition is 70% by mass or more:

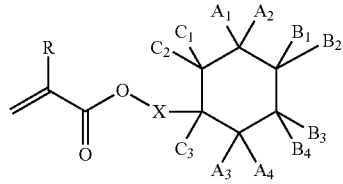

(I)

wherein R represents a hydrogen atom or a methyl group, $A_1$ to $A_4$, $B_1$ to $B_4$, and $C_1$ to $C_3$ each independently represent a hydrogen atom or an alkyl group, $A_1$ or $A_2$, and $A_3$ or $A_4$ may be bonded to each other to form a ring, $B_1$ or $B_2$, and $B_3$ or $B_4$ may be bonded to each other to form a ring, any one of $C_1$ to $C_3$ and any one of $A_1$ to $A_4$ and $B_1$ to $B_4$ may be bonded to each other to form a ring, and X represents a single bond or a divalent linking group, and
the component B is an oligomer having an isophorone structure.

2. The active energy ray-curable ink composition according to claim 1, wherein the N-vinyl compound is a compound represented by the following formula (N):

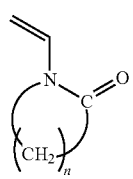

(N)

wherein n represents an integer of 2 to 6.

3. The active energy ray-curable ink composition according to claim 1, wherein the compound represented by the formula (I) is a compound selected from the group consisting of the compounds represented by the following formulae (I-1) to (I-7):

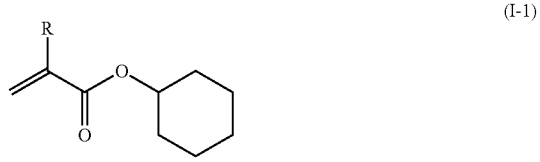

(I-1)

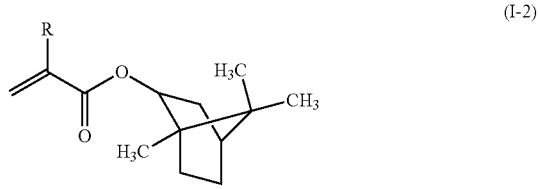

(I-2)

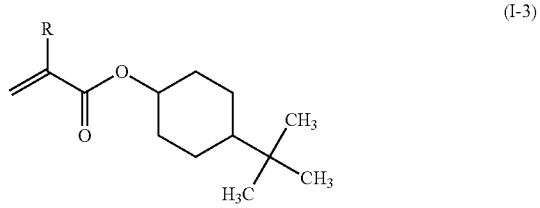

(I-3)

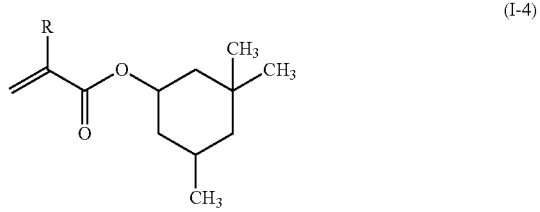

(I-4)

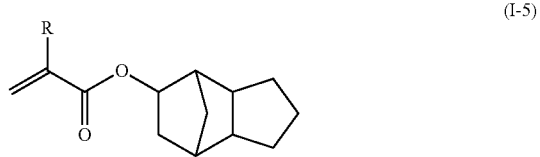

(I-5)

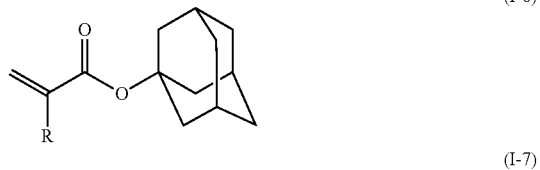

(I-6)

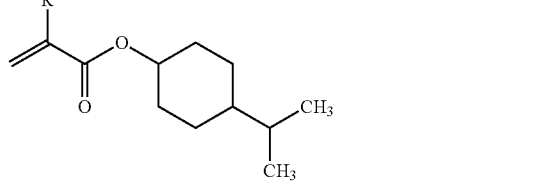

(I-7)

wherein R represents a hydrogen atom or a methyl group.

4. The active energy ray-curable ink composition according to claim 1, wherein the mass ratio of the content of the compound represented by the formula (I) to the content of the component B is the compound represented by the formula (I):the component B=30:1 to 1.5:1.

5. The active energy ray-curable ink composition according to claim 1, further comprising (component D) a polymerization initiator.

6. The active energy ray-curable ink composition according to claim 5, wherein the component D contains an acylphosphine compound.

7. The active energy ray-curable ink composition according to claim 5, wherein the component D contains a thioxanthone compound.

8. The active energy ray-curable ink composition according to claim 1, wherein the component C is a compound represented by the following formula (C-1):

A-B-A'      (C-1)

wherein A represents a group selected from the group consisting of the following (A-1) to (A-3), A' represents a group selected from the group consisting of the following (A'-1) to (A'-3), and B represents a divalent linking group represented by the following formula (B-1) or (B-2):

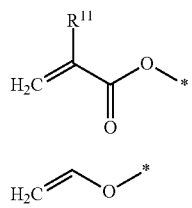
(A-1)

(A-2)

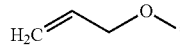
(A-3)

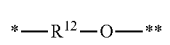
(B-1)

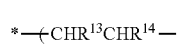
(B-2)

(A'-1)

(A'-2)

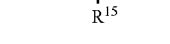
(A'-3)

wherein $R^{11}$ represents a hydrogen atom or a methyl group, $R^{12}$ represents a saturated hydrocarbon group having 2 to 12 carbon atoms, one of $R^{13}$ and $R^{14}$ represents a hydrogen atom and the other represents a hydrogen atom or a methyl group, n1 represents an integer of 2 to 10, $R^{15}$ represents a hydrogen atom or a methyl group, * represents a bonding position between A and B, and ** represents a bonding position between B and A'.

9. The active energy ray-curable ink composition according to claim 8, wherein the component C is a compound represented by the following formula (C-2):

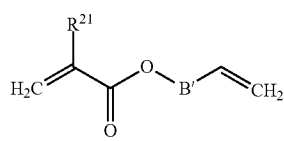
(C-2)

wherein $R^{21}$ represents a hydrogen atom or a methyl group, and B' represents a group represented by the following formula (B'-1) or (B'-2):

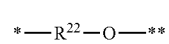
(B'-1)

(B'-2)

wherein $R^{22}$ represents a saturated hydrocarbon group having 2 to 12 carbon atoms, one of $R^{23}$ and $R^{24}$ represents a hydrogen atom and the other represents a hydrogen atom or a methyl group, and n2 represents an integer of 2 to 10, * represents a bonding position between the (meth)acryloxy group and B', and ** represents a bonding position between B and the vinyl group.

10. The active energy ray-curable ink composition according to claim 1, further comprising a compound represented by the following formula (II) as the component A:

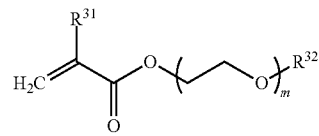
(II)

wherein $R^{31}$ represents a hydrogen atom or a methyl group, $R^{32}$ represents a methyl group or an ethyl group, and m represents an integer of 1 to 5.

11. The active energy ray-curable ink composition according to claim 1, further comprising (component E) a resin having a urethane bond in the main chain, an ethylenically unsaturated group in a side chain and/or at a terminal of the main chain, and a siloxane structure in a side chain and/or at a terminal of the main chain.

12. The active energy ray-curable ink composition according to claim 1, further comprising 2-(2-ethoxyethoxy)ethyl (meth)acrylate as the component A.

13. The active energy ray-curable ink composition according to claim 1, which is used for ink jet recording.

14. An ink jet recording method comprising:
($a^1$) discharging the active energy ray-curable ink composition according to claim 1 onto a recording medium by an ink jet system, and
($b^1$) irradiating the discharged ink composition with active energy rays to cure the ink composition.

15. The ink jet recording method according to claim 14, wherein the light source of active energy rays is a light-emitting diode.

16. A decorative sheet having a cured image layer of the active energy ray-curable ink composition according to claim 1 provided on a resin sheet.

17. A decorative sheet molded product obtained by subjecting the decorative sheet according to claim 16 to vacuum molding, pressure molding, or vacuum pressure molding.

18. A method for producing an in-mold molded product, comprising:
disposing the decorative sheet according to claim 16 on the inner wall of a hollow portion formed by plural molds; and
injecting a molten resin from a gate into the hollow portion.

19. An in-mold molded product obtained by the production method according to claim 18.

* * * * *